(12) United States Patent
Lu

(10) Patent No.: US 11,595,574 B1
(45) Date of Patent: Feb. 28, 2023

(54) IMAGE PROCESSING SYSTEM AND METHOD THEREOF FOR GENERATING PROJECTION IMAGES BASED ON INWARD OR OUTWARD MULTIPLE-LENS CAMERA

(71) Applicant: ASPEED Technology Inc., Hsinchu (TW)

(72) Inventor: Chung-Yen Lu, Hsinchu (TW)

(73) Assignee: ASPEED TECHNOLOGY INC., Hsinchu (TW)

( * ) Notice: Subject to any disclaimer, the term of this patent is extended or adjusted under 35 U.S.C. 154(b) by 0 days.

(21) Appl. No.: 17/564,985

(22) Filed: Dec. 29, 2021

(51) Int. Cl.
| | | |
|---|---|---|
| *H04N 5/232* | (2006.01) | |
| *G06T 7/80* | (2017.01) | |
| *G06T 3/00* | (2006.01) | |
| *H04N 5/225* | (2006.01) | |

(52) U.S. Cl.
CPC ....... *H04N 5/23232* (2013.01); *G06T 3/0093* (2013.01); *G06T 7/80* (2017.01); *H04N 5/23238* (2013.01); *H04N 5/23245* (2013.01); *H04N 5/2258* (2013.01)

(58) Field of Classification Search
CPC .......... H04N 5/23232; H04N 5/23238; H04N 5/23245; H04N 5/2258; G06T 3/0093; G06T 7/80
USPC ....................................................... 348/369
See application file for complete search history.

(56) References Cited

U.S. PATENT DOCUMENTS

| | | | |
|---|---|---|---|
| 10,810,700 B2 | 10/2020 | Lu | |
| 2008/0137200 A1* | 6/2008 | Hsu ...................... | G02B 5/0278 359/599 |
| 2012/0032951 A1* | 2/2012 | Lee ..................... | H04N 13/275 345/419 |
| 2015/0022873 A1* | 1/2015 | Martin ................ | G02B 26/101 359/226.2 |
| 2018/0092534 A1* | 4/2018 | Nabhan .................. | A61B 3/10 |
| 2018/0357804 A1 | 12/2018 | Forutanpour | |
| 2020/0074716 A1 | 3/2020 | Kaplan | |

\* cited by examiner

*Primary Examiner* — Usman A Khan
(74) *Attorney, Agent, or Firm* — Muncy, Geissler, Olds & Lowe, P.C.

(57) ABSTRACT

An image processing system is disclosed, comprising: an M-lens camera, a compensation device and a correspondence generator. The M-lens camera generates M lens images. The compensation device generates a projection image according to a first vertex list and the M lens images. The correspondence generator is configured to conduct calibration for vertices to define vertex mappings, horizontally and vertically scan each lens image to determine texture coordinates of its image center, determine texture coordinates of control points according to the vertex mappings, and P1 control points in each overlap region in the projection image; and, determine two adjacent control points and a coefficient blending weight for each vertex in each lens image according to the texture coordinates of the control points and the image center in each lens image to generate the first vertex list, where M>=2.

25 Claims, 23 Drawing Sheets inward two-lens camera polygon mesh on equirectangular domain

Triangle mesh modeling a sphere

IMAGE PROCESSING SYSTEM AND METHOD THEREOF FOR GENERATING PROJECTION IMAGES BASED ON INWARD OR OUTWARD MULTIPLE-LENS CAMERA

BACKGROUND OF THE INVENTION

Field of the Invention

The invention relates to wide-angle imaging, and more particularly, to a method and system for generating projection images based on an inward or outward multiple-lens camera.

Description of the Related Art

FIG. 1A is a diagram showing a relation between a cube framework 11A and a sphere 12 disclosed in U.S. Pat. No. 10,810,700 B2 (the disclosure of which is incorporated herein by reference in its entirety). FIG. 1B shows an equirectangular panoramic image derived from an equirectangular projection of six lens images (top, bottom, right, left, front, back) from a six-lens camera mounted on the six-face of the cube framework 11A in FIG. 1A. Since there are six-face lens images in FIG. 1B, we can infer that the six lenses (top, bottom, right, left, front, back) of the camera respectively mounted on the six-face of the cube framework 11A are directed "outward" relative to the gravity center of the cube framework 11A as shown in FIG. 2A. The interior angle θ1 formed between any two adjacent rims/surfaces of the framework 11A that the lenses are mounted is 90°. Hereinafter, the six-lens camera in FIG. 2A is called "outward six-lens camera". FIG. 2B is an exemplary outward three-lens camera mounted on a framework 11B. The outward three-lens camera in FIG. 2B is used to generate three lens images for a wide-angle image, and the interior angles θ2 formed between any two adjacent rims/surfaces of the framework 11B that the lenses are mounted are less than 180°. However, the downside of the above outward multiple-lens cameras is that the lenses generally protrude from the housing 22 of electronic products, so the electronic products are inconvenient to carry around and the lenses are subject to abrasion from use.

What is needed is an image processing system having an "inward" multiple-lens camera for generating wide-angle images and free of lens abrasion.

SUMMARY OF THE INVENTION

In view of the above-mentioned problems, an object of the invention is to provide an image processing system having an inward multiple-lens camera for generating projection images and free of lens abrasion.

One embodiment of the invention provides an image processing system, comprising: an M-lens camera, a compensation device and a correspondence generator. The M-lens camera captures a X-degree horizontal field of view (HFOV) and a Y-degree vertical FOV to generate M lens images. The compensation device generates a projection image according to a first vertex list and the M lens images. The correspondence generator is configured to perform a set of operations comprising: conducting calibration for vertices to define first vertex mappings between the M lens images and a projection image; horizontally and vertically scanning each lens image to determine texture coordinates of an image center of each lens image; determining texture coordinates of control points according to the vertex mappings and P1 control points in each overlap region in the projection image; and, determining two adjacent control points and a coefficient blending weight for each vertex in each lens image according to the texture coordinates of the control points and the image center in each lens image to generate the first vertex list, wherein X<=360, Y<180, M>=2 and P1>=3.

Another embodiment of the invention provides an image processing system, comprising: conducting calibration for vertices to define first vertex mappings between a projection image and M lens images generated by an M-lens camera that captures a X-degree horizontal FOV and a Y-degree vertical FOV; horizontally and vertically scanning each lens image to determine texture coordinates of an image center of each lens image; determining texture coordinates of control points according to the first vertex mappings and P1 control points in each overlap region in the projection image; determining two adjacent control points and a coefficient blending weight for each vertex in each lens image according to the texture coordinates of the control points and the image center in each lens image to generate a first vertex list; and, generating the projection image according to the first vertex list and the M lens images; wherein X<=360, Y<180, M>=2 and P1>=3.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1B:
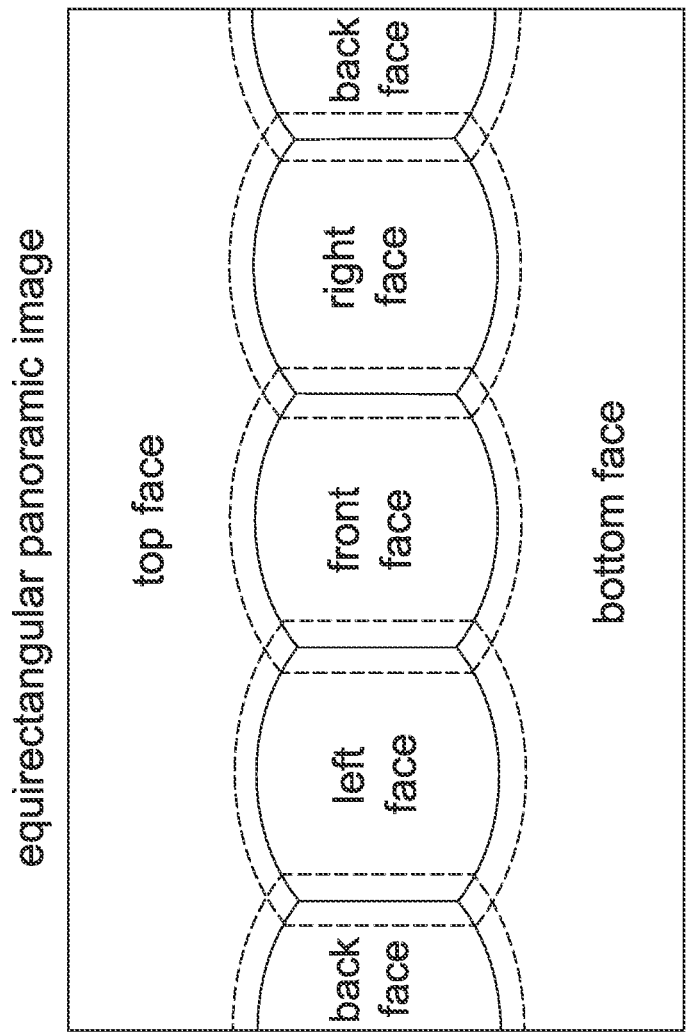
FIG. 1B shows an equirectangular panoramic image derived from an equirectangular projection of six-face lens images from a six-lens camera mounted on the six-face of the cube framework 11A in FIG. 1A.
Figure 1A:
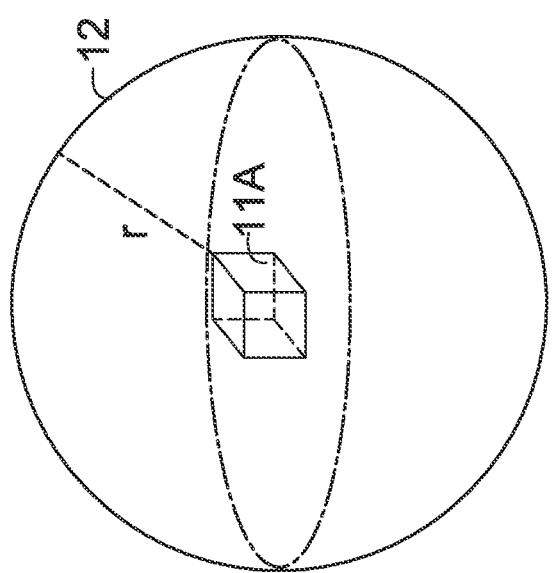
FIG. 1A is a diagram showing a relation between a cube framework 11A and a sphere 12 disclosed in U.S. Pat. No. 10,810,700 B2.

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context. Throughout the specification, the same components with the same function are designated with the same reference numerals.

A feature of the invention is to use an inward multiple-lens camera to generate multiple lens images and then produce a wide-angle image by a stitching and blending process.

Figures 2A, 2B:
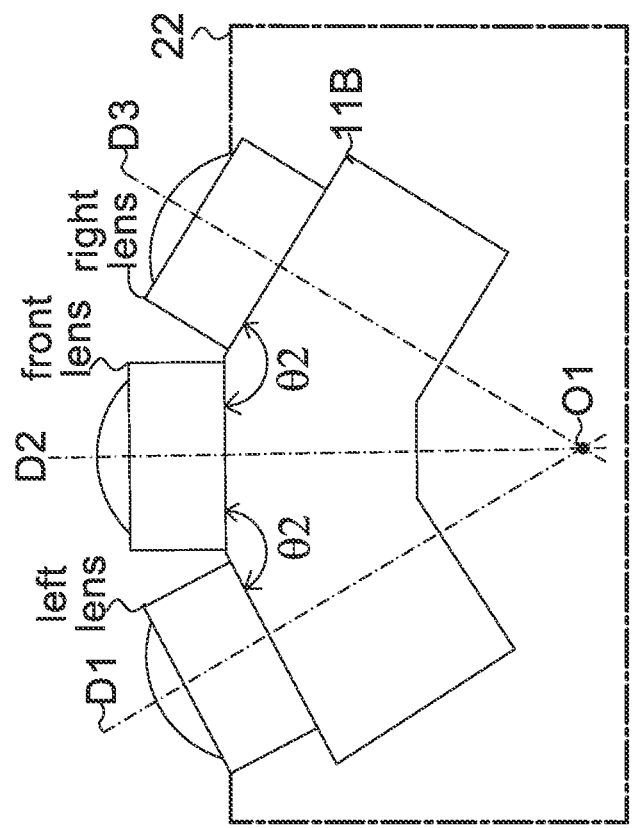
FIG. 2A is an exemplary outward six-lens camera mounted on a framework 11A related to FIG. 1A.
FIG. 2B is an exemplary outward three-lens camera mounted on a framework 11B and protruding from the housing 22.
Figure 3A:
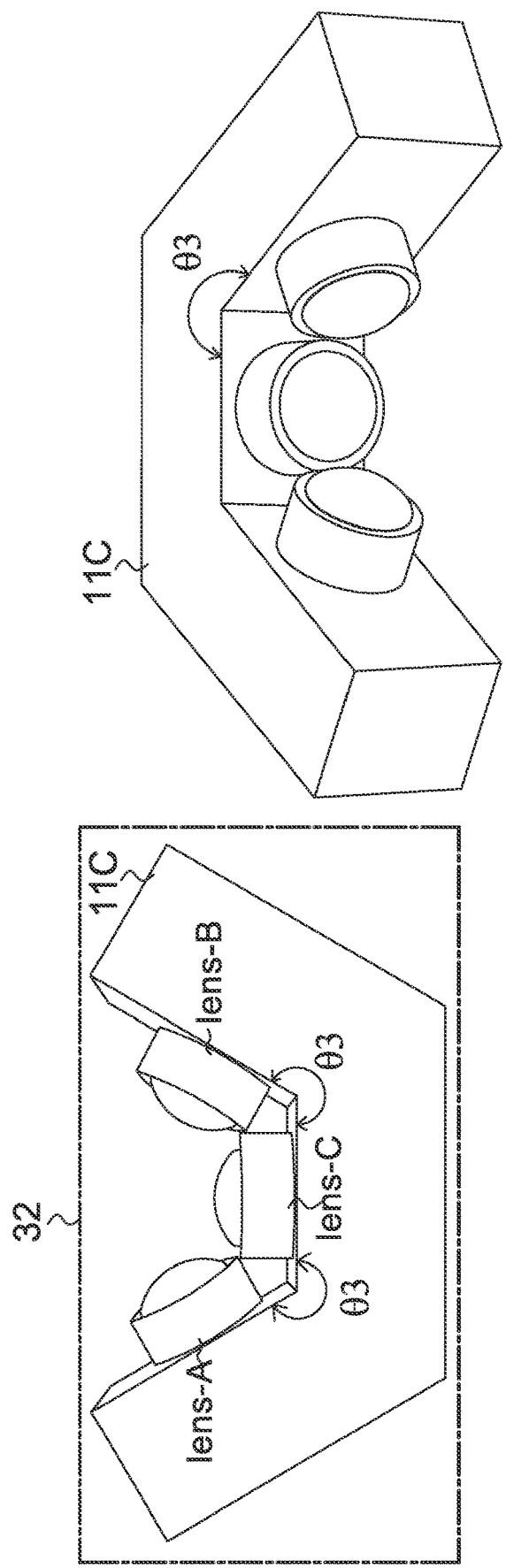
FIG. 3A shows two different side views of an exemplary inward three-lens camera mounted on a framework 11C and kept free of lens abrasion inside the housing 32 according to an embodiment of the invention.
Figure 3B:
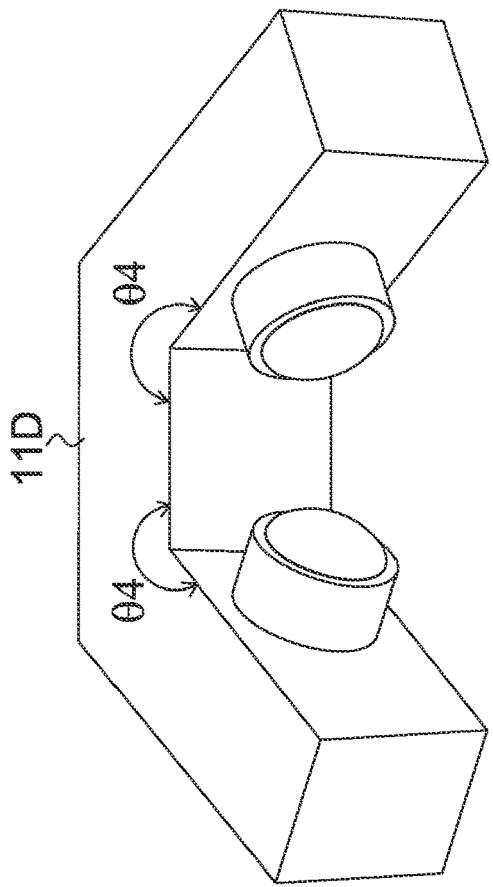
FIG. 3B shows two different side views of an exemplary inward two-lens camera mounted on a framework 11D according to an embodiment of the invention.
Figure 3B:
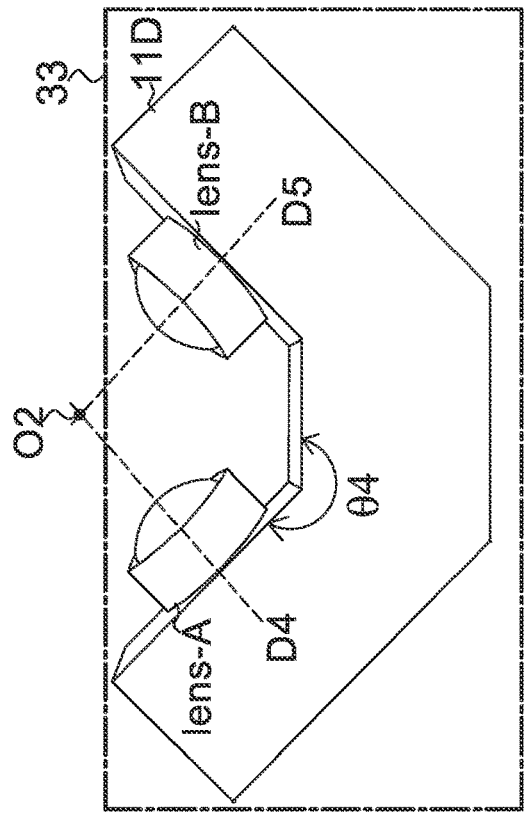

FIG. 3A shows two different side views of an exemplary inward three-lens camera mounted on a framework 11C according to an embodiment of the invention. FIG. 3B shows two different side views of an exemplary inward two-lens camera mounted on a framework 11D according to an embodiment of the invention. The reflex angle θ3 formed by two adjacent rims/faces of the framework 11C and the reflex angle θ4 formed by two adjacent rims/faces of the framework 11D are less than 270° and greater than 180°. Each outward multiple-lens camera has an internal center while each inward multiple-lens camera has an external center. For example, the intersection O1 of the optical axes D1, D2 and D3 of the three lenses (left-lens, front-lens and right-lens) is formed inside the framework 11B or below the three lenses for the outward three-lens camera in FIG. 2B and thus is called "internal center". By comparison, the intersection O2 of the optical axes D4 and D5 of lenses (lens-A and lens-B) is formed outside the framework 11D or above the two lenses for the inward two-lens camera in FIG. 3B and the intersection O3 of the optical axes D6, D2 and D7 of three lenses (lens-A, Lens-C and lens-B) is formed outside the framework 11C or above the three lenses for the inward three-lens camera in FIG. 4A. Thus, the intersections O2~O3 are called "external center".

The advantage of the inward multiple-lens cameras is that the lenses are fully wrapped in the housing 32/33 of electronic products, so the electronic products are convenient to carry around and the lenses are free of abrasion from use.

Figure 4A:
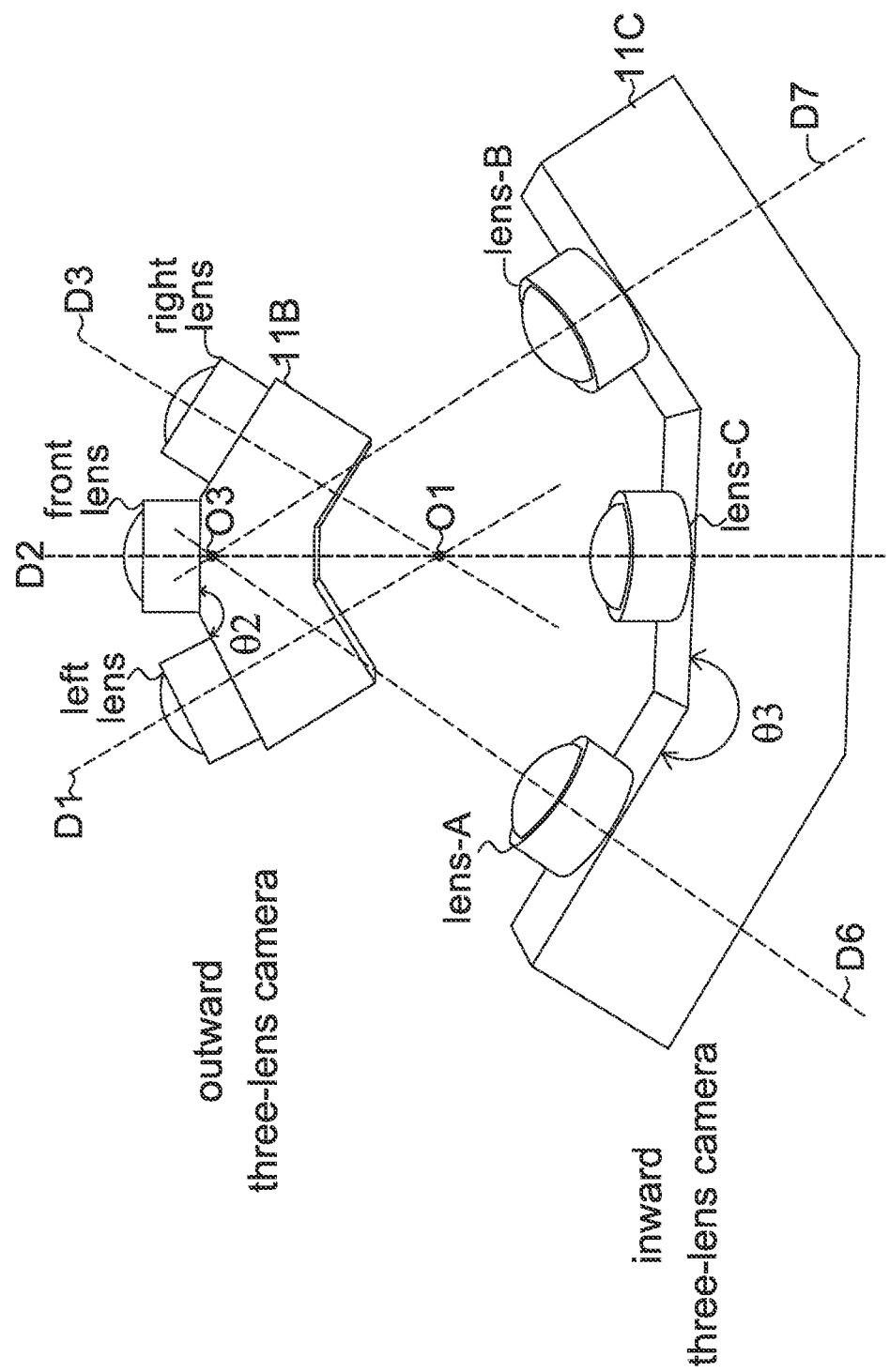
FIG. 4A is a diagram showing an example arrangement of an outward three-lens camera and an inward three-lens camera.
Figure 4B:
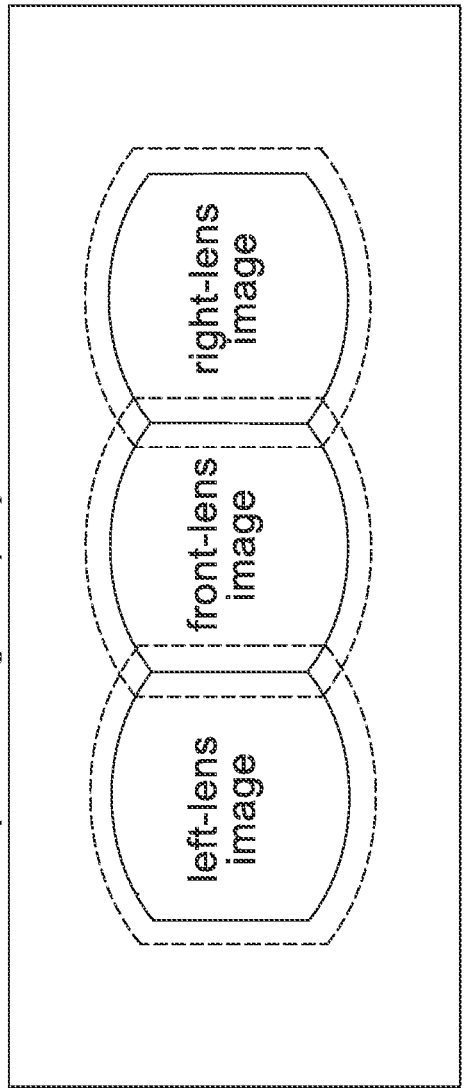
FIG. 4B shows an exemplary wide-angle image containing three lens images captured from the outward three-lens camera in FIG. 4A.
Figure 4C:
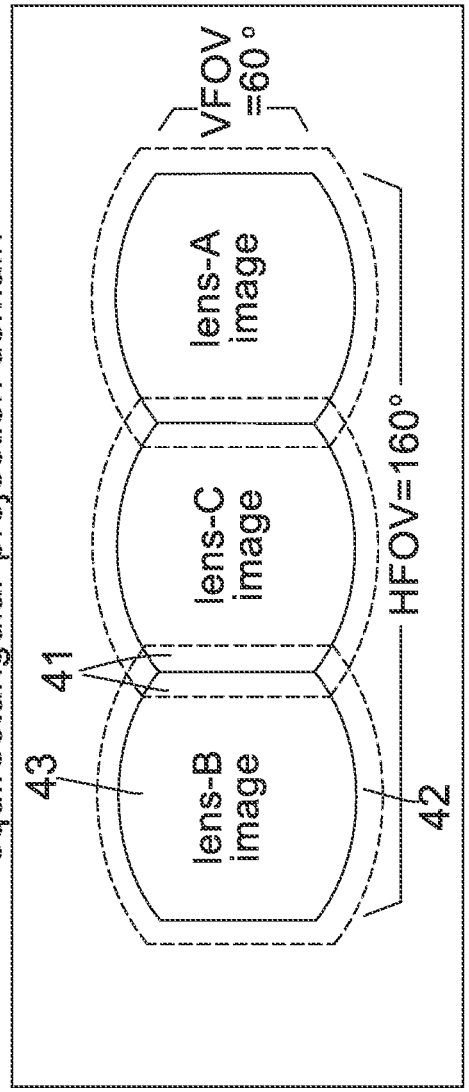
FIG. 4C shows an exemplary wide-angle image containing three lens images captured from the inward three-lens camera in FIG. 4A.
Figure 4D:
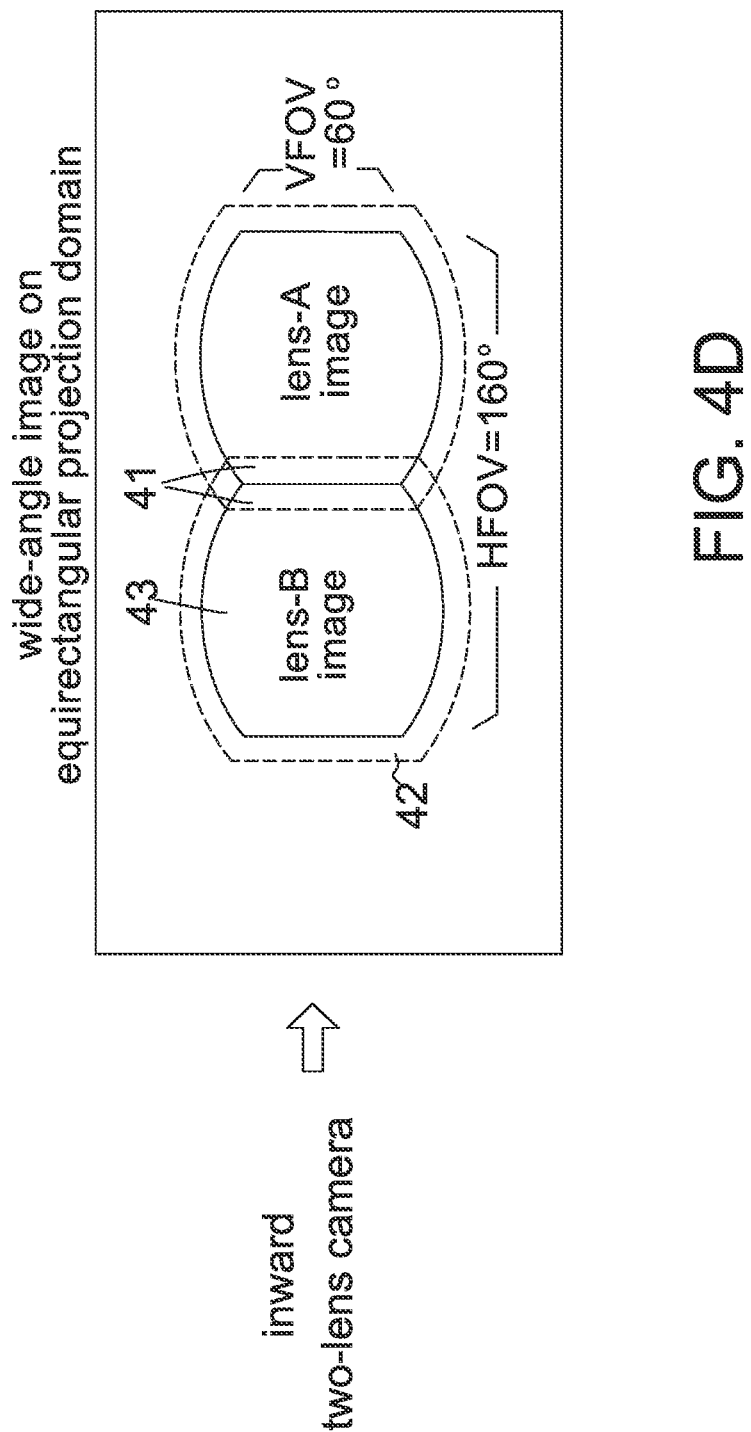
FIG. 4D shows an exemplary wide-angle image containing two lens images captured from the inward two-lens camera in FIG. 3B.

FIG. 4A is a diagram showing an example arrangement of an outward three-lens camera and an inward three-lens camera. FIG. 4B shows an exemplary wide-angle image containing three lens images captured from the outward three-lens camera in FIG. 4A. FIG. 4C shows an exemplary wide-angle image containing three lens images captured from the inward three-lens camera in FIG. 4A. FIG. 4D shows an exemplary wide-angle image containing two lens images captured from the inward two-lens camera in FIG. 3B. The arrangement of the two cameras in FIG. 4A is merely made for comparison. The sequence of lenses (from left to right: left-lens, front-lens, right-lens) mounted on the framework 11B for the outward three-lens camera in FIG. 4A is the same as the sequence of the three lens images disposed in the wide-angle image in FIG. 4B. However, the sequence of lenses (from left to right: lens-A, lens-C, lens-B) mounted on the framework 11C for the inward three-lens camera in FIG. 4A is opposite to the sequence of lens images (from left to right: lens-B image, lens-C image, lens-A image) disposed in the wide-angle image in FIG. 4C; besides, the sequence of lenses (from left to right: lens-A, lens-B) mounted on the framework 11D for the inward two-lens camera in FIG. 3B is also opposite to the sequence of lens images (from left to right: lens-B image, lens-A image) disposed in the wide-angle image in FIG. 4D. In the example of FIG. 4A, the interior angles θ2 for the framework 11B and the reflex angle θ3 for the framework 11C are properly selected so that the degree of the optical axis D7 for the lens-B of the inward three-lens camera relative to the horizontal line (not shown) is the same as the degree of the optical axis D1 for the left lens of the outward three-lens camera relative to the horizontal line and the degree of the optical axis D6 for the lens-A of the inward three-lens camera relative to the horizontal line is the same as the degree of the optical axis D3 for the right lens of the outward three-lens camera relative to the horizontal line. However, even with the same degrees of the optical axes, there are offsets between the left-lens image and the lens-B image and between the right-lens image and the lens-A image. Accordingly, the lens images from the inward multiple-lens camera need to be properly stitched and blended to form high-quality wide-angle images.

According to the invention, each lens of the inward/outward multiple-lens camera simultaneously captures a view with a x1-degree horizontal field of view (HFOV) and a y1-degree vertical FOV (VFOV) to generate a lens image and then the multiple lens images from the inward/outward multiple-lens camera form a projection image with a x2-degree HFOV and a y2-degree VFOV, where $0<x1<x2<=360$ and $0<y1<y2<180$. For example, each lens of the inward three-lens camera in FIG. 4A simultaneously captures a view with a 70-degree HFOV and a 70-degree VFOV to generate a lens image, and then the lens-B image, the lens-C image and the lens-A image form a wide-angle image with a 160-degree HFOV and a 60-degree VFOV in FIG. 4C; each lens of the inward two-lens camera in FIG. 3B simultaneously captures a view with a 100-degree HFOV and a 70-degree VFOV to generate a lens image and then the lens-B image and the lens-A image form a wide-angle image with a 160-degree HFOV and a 60-degree VFOV in FIG. 4D. A requirement of mounting the multiple-lens camera is that there should be sufficient overlaps between the views of two adjacent lenses, so as to facilitate image mosaicking. Referring to FIGS. 4C-4D, pixels in overlap regions 41 are overlapping by two lens images while pixels in non-overlap regions 43 come from a single lens image with pixels in regions 42 being discarded. Thus, the image processing apparatus 520 needs to perform blending and stitching operations over the overlap regions 41 to form a wide-angle image (will be described below).

Figure 5A:
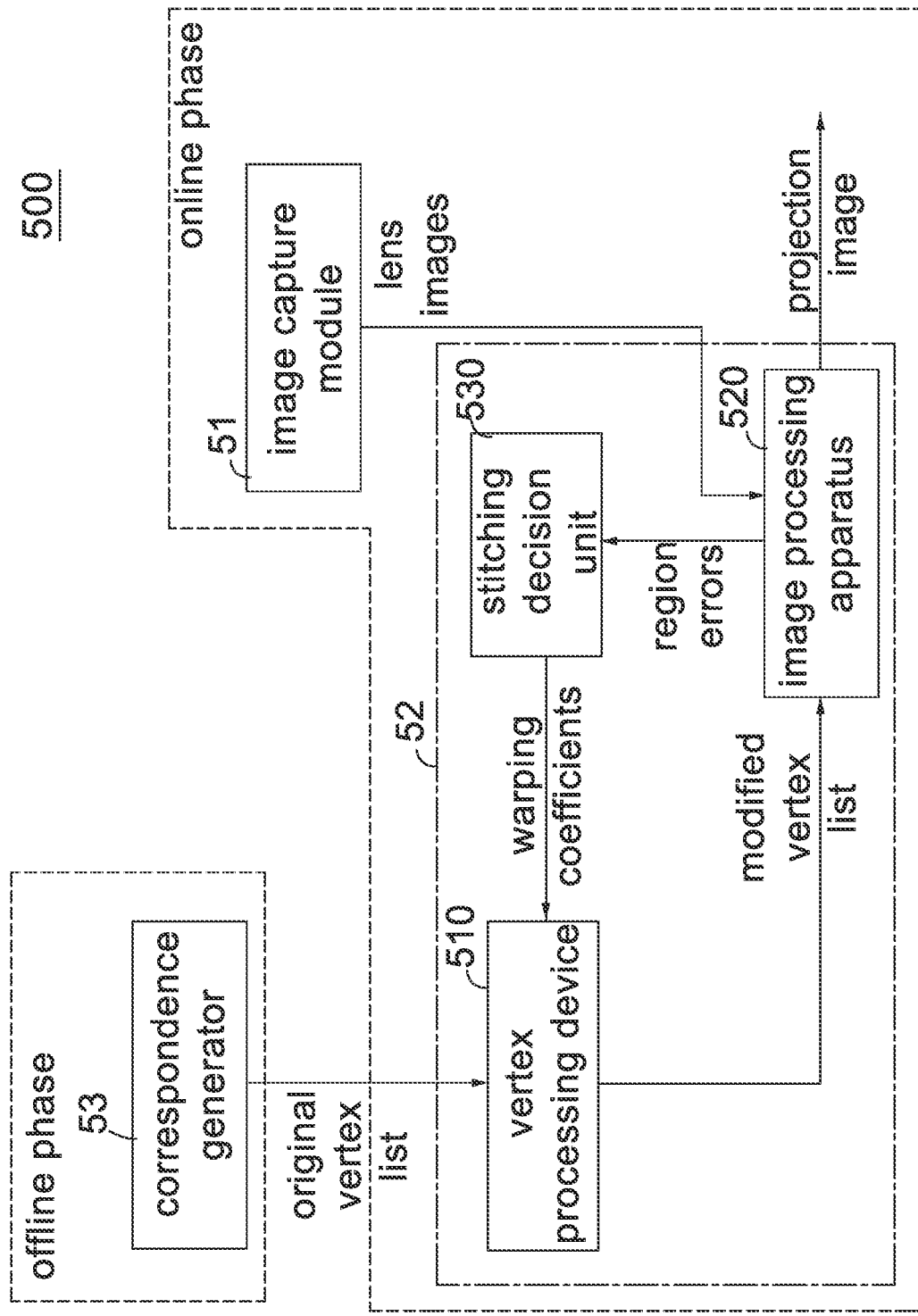
FIG. 5A is a block diagram showing a projection image processing system according to an embodiment of the invention.

FIG. 5A is a block diagram showing a projection image processing system according to an embodiment of the invention. Referring to FIG. 5A, the projection image processing system 500 includes an image capture module 51, a compensation device 52 and a correspondence generator 53. The compensation device 52 receives an original vertex list from the correspondence generator 53 and multiple lens images from the image capture module 51 and generates a projection image, such as a panoramic image or a wide-angle image.

A wide variety of projections are suitable for use in the projection image processing system 500 of the invention. The term "projection" refers to flatten a globe's surface into a 2D plane, e.g., a projection image. The projection includes, without limitations, equirectangular projection, cylindrical projection and modified cylindrical projection. The modified cylindrical projection includes, without limitations, Miller projection, Mercator projection, Lambert cylindrical equal area projection and Pannini projection. Thus, the projection image includes, without limitations, an equirectangular projection image, a cylindrical projection image and a modified cylindrical projection image. FIGS. 1A-1B, 6A-6C, 8A-8D and 10B-10C are associated with equirectangular projection. The implementations of the cylindrical projection and the modified cylindrical projection are well known to those skilled in the art and thus will not be described herein. Please note that no matter whichever projection the projection image processing system 500 uses, the correspondence generator 53 would correspondingly generate an original vertex list (such as Table 1) that define the vertex mappings between the lens images and the projection image.

The image capture module 51 is a multiple-lens camera, such as an outward multiple-lens camera, an inward two-lens camera or an inward three-lens camera, which is capable of simultaneously capturing a view with a X-degree HFOV and a Y-degree VFOV to generate a plurality of lens images, where $X<=360$ and $Y<180$. For purpose of clarity and ease of description, the following examples and embodiments are described with reference to equirectangular projection and with the assumption that the image capture module 51 is an inward three-lens camera and the projection image is an equirectangular wide-angle image. The operations of the projection image processing system 500 and the methods described in connection with FIGS. 7B-7C, 8A-8D and 9A-9C are also applicable to the cylindrical projection, the modified cylindrical projection, the outward multiple-lens camera and the inward two-lens camera.

Throughout the specification and claims, the following terms take the meanings explicitly associated herein, unless the context clearly dictates otherwise. The term "texture coordinates" refers to a 2D Cartesian coordinate system in a texture space (such as a lens/texture image). The term "rasterization" refers to a process of computing the mapping from scene geometry (or from the projection image) to texture coordinates of each lens image.

The processing pipeline for the projection image processing system 500 is divided into an offline phase and an online phase. In the offline phase, the three inward lenses of the image capture module 51 are calibrated separately. The correspondence generator 53 adopts appropriate image registration techniques to generate an original vertex list, and each vertex in the original vertex list provides the vertex mapping between the equirectangular projection image and lens images (or between the equirectangular coordinates and the texture coordinates). For example, the sphere 62 in FIG. 6A with 2-meter radius (r=2) is drawn in many circles as latitude and longitude, whose intersection points are treated as calibration points. The three lenses of the image capture module 51 mounted on the framework 110 capture these calibration points, and their positions on lens images are known. Then the mapping relationship between the equirectangular projection image and lens images are constructed since the view angles of the calibration points and texture coordinates are linked. A calibration point with the mapping relationship is defined as a "vertex" in this invention. In brief, the correspondence generator 53 conducts calibration for the vertices for defining vertex mappings between the lens images and the equirectangular projection image to obtain the original vertex list. The correspondence generator 53 completes all necessary computations in the offline phase.

Figure 6A:
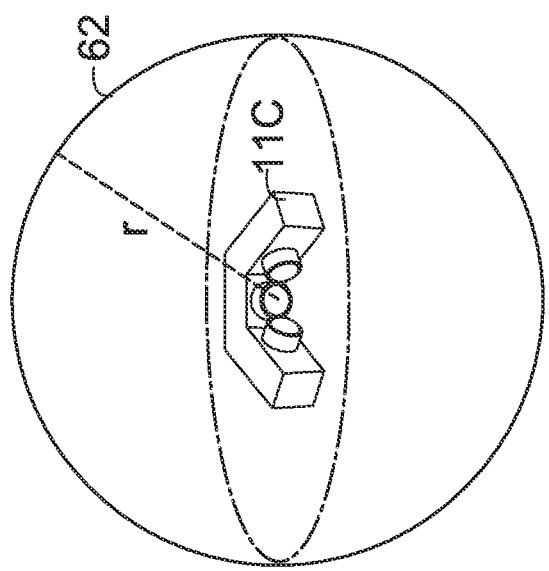
FIG. 6A is a diagram showing a relation between a framework 11C and a sphere 62.
Figure 6C:
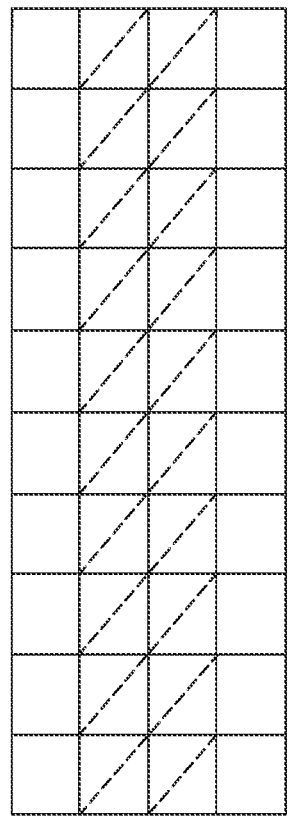
FIG. 6C shows a polygon mesh composing/modeling an equirectangular projection image.
Figure 6B:
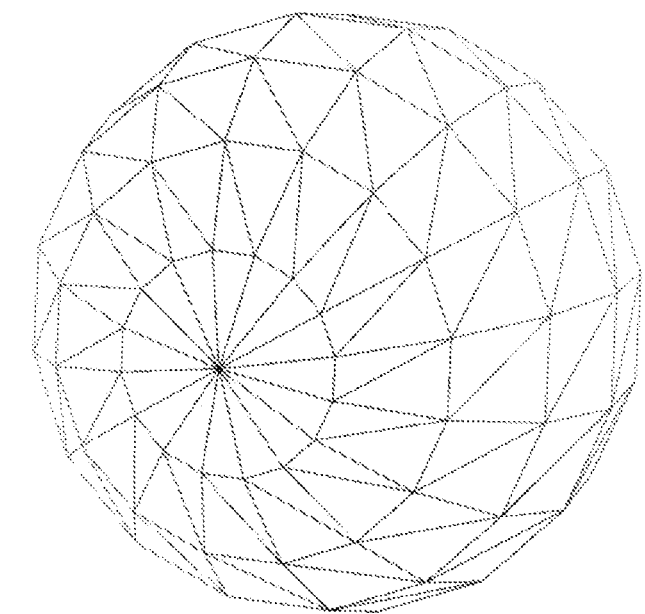
FIG. 6B shows a triangle mesh modeling a sphere surface.

FIG. 6B shows a triangle mesh modeling a sphere surface. The surface of the sphere 62 is modeled by using a triangle mesh as shown in FIG. 6B. FIG. 6C shows a polygon mesh composing/modeling the equirectangular projection image. The polygon mesh of FIG. 6C is produced by performing an equirectangular projection of the triangle mesh of FIG. 6B. The polygon mesh in FIG. 6C is a collection of quadrilaterals and/or triangles defined by the vertices.

According to the geometry of the equirectangular projection image and lens images, the correspondence generator 53 in offline phase computes equirectangular coordinates and texture coordinates for each vertex in the polygon mesh in FIG. 6C to generate an original vertex list. Afterward, the correspondence generator 53 supplies the original vertex list to the vertex processing device 510. The original vertex list is a list of a plurality of vertices forming a plurality of quadrilaterals and/or triangles of the polygon mesh in FIG. 6C and each vertex is defined by its corresponding data structure. The data structure defines a vertex mapping between a destination space and a texture space (or between the equirectangular coordinates and the texture coordinates). Table 1 shows an exemplary data structure of each vertex in the original vertex list.

TABLE 1

| Attributes | Descriptions |
| --- | --- |
| (x, y) | Equirectangular coordinates |
| N | Number of covering/overlapping lens images |
| $ID_1$ | ID of first lens image |
| $(u_1, v_1)$ | Texture coordinates in first lens image |
| $(idx_{10}, idx_{11})$ | Warping coefficient indices in first lens image |
| $Alpha_1$ | Blending weight for warping coefficients in first lens image |
| $w_1$ | Blending weight for stitching in first lens image |
| ... | ... |
| $ID_N$ | ID of $N^{th}$ lens image |
| $(u_N, v_N)$ | Texture coordinates in $N^{th}$ lens image |
| $(idx_{N0}, idx_{N1})$ | Warping coefficient indices in $N^{th}$ lens image |
| $Alpha_N$ | Blending weight for warping coefficients in $N^{th}$ lens image |
| $w_N$ | Blending weight for stitching in $N^{th}$ lens image |

In an ideal case, the lens centers 76 of the three lenses in the image capture module 51 are simultaneously located at the camera system center 73 of the framework 110 (not shown), so a single ideal imaging point 70 derived from a far object 75 is located on an image plane 62 with 2-meter radius (r=2). Take lens-B and lens-C for example. Since the ideal imaging position 70 in the lens-B image matches the ideal image position 70 in the lens-C image, a perfect stitching/blending result is produced in the equirectangular wide-angle image after an image stitching/blending process is completed. However, in real cases, the lens centers 76 for lens-B and Lens-C are separated from the system center 73 by an offset ofs as shown in left portion of FIG. 7A, so a mismatch image defect would be clearly shown in the equirectangular wide-angle image.

Due to the optical characteristics of lenses, such as lens shading and luma shading, the image center 74 of a lens image with a size of Wi×Hi is not necessarily located in the middle (Wi/2, Hi/2) of the lens image, where Wi and Hi respectively denote the width and height of the lens image. In offline phase, the correspondence generator 53 takes the following five steps to determine the texture coordinates of a real image center 74 of each lens image: (i) Determine a luma threshold TH for defining the edge boundary of one lens image. (ii) Scan each row of pixels from left to right to determine a left boundary point of each row as shown in FIG. 7B. During the scan, if the luma value of a pixel is less than TH, it is determined that the pixel is located outside the lens image, otherwise, it is determined that the pixel is located inside the lens image, and then, the left boundary point of each row is stored. Likewise, scan each row of pixels from right to left to determine and store a right boundary point of each row; scan each column of pixels from top to bottom to determine and store a top boundary point of each row; scan each column of pixels from bottom to top to determine and store a bottom boundary point of each column as shown in FIG. 7C. (iii) Calculate a row center Uc(i) for row i according to its left boundary and the right boundary points and calculate a column center Vc(j) for column j according to its top boundary and the bottom boundary points, where 0<=i<=(Wi−1) and 0<=j<=(Hi−1). (iv) Average the row centers of all rows to obtain an average u value and average the column centers of all columns to obtain an average v value. (v) Set the texture coordinates ($u_{center}$, $v_{center}$) of the real image center 74 of the lens image to the average u and v values, respectively. In a case that the real image center 74 is not allowed to be calculated in the above manner, set the texture coordinates ($u_{center}$, $v_{center}$) of the real image center 74 of the lens image to (Wi/2, Hi/2), respectively.

Figure 8A:
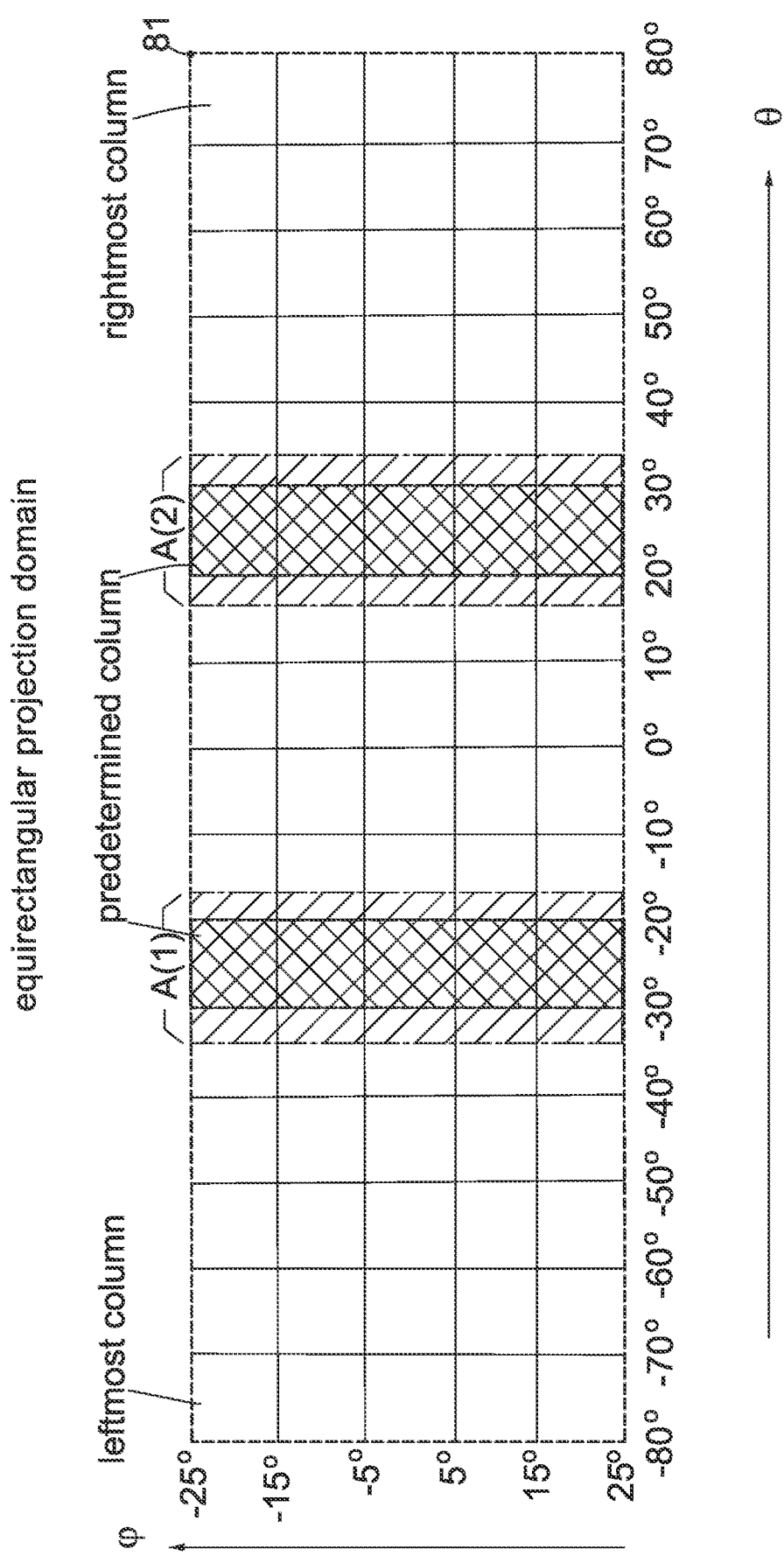
FIG. 8A is a diagram showing an example grid modeling an equirectangular wide-angle image containing two overlap regions A(1)~A(2) and three lens images from the inward-lens camera in FIG. 3A.

FIG. 8A is a diagram showing an example grid modeling an equirectangular wide-angle image. Referring to FIG. 8A, the grid can be visualized as a rectangular structure with five rows and sixteen columns of quadrilaterals in an equirectangular wide-angle image. The example grid in FIG. 8A correspond to the polygon mesh in FIG. 6C and thus the vertices/intersection 81 of the grid in FIG. 8A correspond to the vertices of the polygon mesh in FIG. 6C. The horizontal spacing between any two neighboring vertices in horizontal axis is equal and the vertical spacing between any two neighboring vertices in vertical axis is equal in the equirectangular coordinate system. Horizontal and vertical axes in FIG. 8A refer to θ and φ for longitude and latitude. In the example of FIG. 8A, it is assumed that the three lenses of the image capture module 51 are capable of simultaneously capturing a view with a 160-degree horizontal FOV and a 50-degree vertical FOV to generate three lens images that forms the equirectangular wide-angle image.

According to the invention, each overlap region in the projection image contains P1 control points in a column, where P1>=3. The sizes of the overlap regions are varied according to the FOVs of the lenses, the resolutions of lens sensors and the lens angles arranged in the image capture module 51. Normally, the width of each overlap region is greater than or equal to a multiple of the width of one column of quadrilaterals in the projection image. If there are multiple columns of quadrilaterals located inside each overlap region, only one column of quadrilaterals (hereinafter called "predetermined column") inside each overlap region is pre-determined for accommodating P1 control points. In the example of FIG. 8A, there are two overlap regions A(1) and A(2), and only one column of quadrilaterals is located inside each overlap region and directly defined as the predetermined column for accommodating the P1 control points.

Figure 8B:
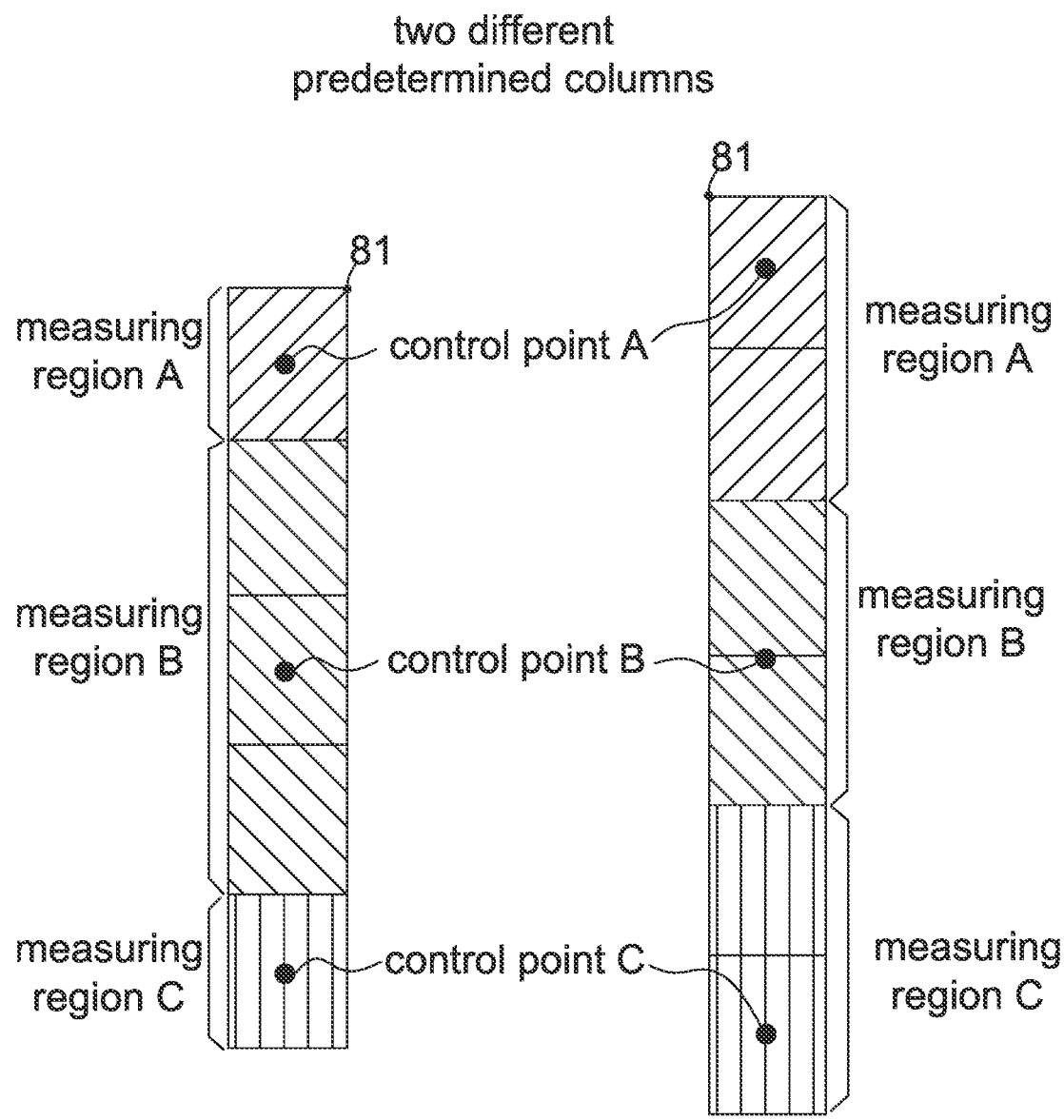
FIG. 8B shows two examples of two different numbers of quadrilaterals in two different predetermined columns with P1=3.

In offline phase, the correspondence generator 53 takes the following four steps (a)~(d) to determine the texture coordinates of control points in the equirectangular wide-angle image: (a) Define the leftmost and the rightmost columns of quadrilaterals and the predetermined column located in each overlap region in the equirectangular wide-angle image as control columns. (b) For each control column, respectively place the top and the bottom control points at the centers of the top and the bottom quadrilaterals. In this step (b), x coordinates of the control points in one column in equirectangular domain are determined according to x coordinates (e.g., x1 and x2) of the right boundary and the left boundary of quadrilaterals in each control column, e.g., x=(x1+x2)/2. (c) Divide the distance between the top and the bottom control points by (P1−2) to obtain the y coordinates of (P1−2) control points in equirectangular domain for each control column. In other words, the (P1−2) control points are evenly distributed between the top and the bottom control points for each control column. FIG. 8B shows two examples of two different numbers of quadrilaterals in two different predetermined columns with P1=3. As shown in FIG. 8B, the numbers of quadrilaterals in the two different predetermined columns are five and six, respectively, and thus the control points A-'C in the two different predetermined columns have different y coordinates. Measuring regions (for measuring region errors in measure mode) are defined as follows: for the quadrilateral i in each predetermined column in each overlap region, search for a control point j closest to the quadrilateral i and categorize the quadrilateral i as the measuring region j corresponding to the control point j, where $1 =< i <= n1$, $1 =< j =< P1$ and n1 denotes the number of quadrilaterals in each predetermined column. (d) Perform interpolation to obtain texture coordinates of each control point based on its equirectangular coordinates and the original vertex list (that defines the vertex mapping between the equirectangular coordinates and the texture coordinates).

Figure 8C:
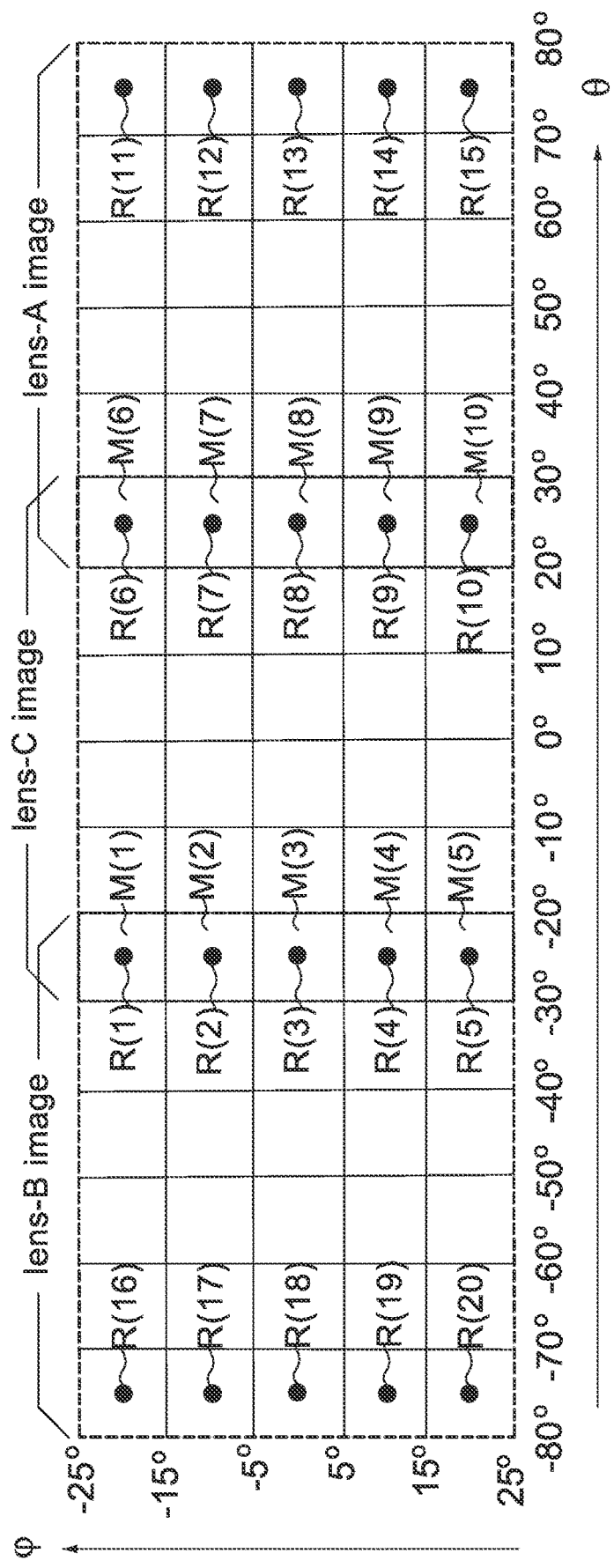
FIG. 8C shows a position relationship between twenty control points R(1)~(20) and ten measuring regions M(1)~(10) in the equirectangular wide-angle image in connection with FIG. 8A with P1=5.

FIG. 8C is a diagram showing twenty control points R(1)~R(20) and ten measuring regions M(1)~M(10) in the equirectangular wide-angle image in connection with FIG. 8A with five (P1=5) control points in each control column. The twenty control points R(1)~R(20) in FIG. 8C respectively have twenty warping coefficients C(1)~C(20). The warping coefficients C(1)~C(20) respectively denote different warping degrees for the control points R(1)~R(20). In FIG. 8C, the ten control points R(1)~R(10) are located in overlap regions A(1) and A(2) while the ten control points R(11)~R(20) are located in non-overlap region. Because the ten control points R(11)~R(20) are located in non-overlap region, the warping coefficients C(11)~C(20) are set to a constant, such as 1 and thus are called constant warping coefficients throughout the specification. The following examples and embodiments will be described with the twenty control points R(1)~R(20) and the ten measuring regions M(1)~M(10) in the equirectangular wide-angle image in FIG. 8C.

Referring back to FIG. 5A, the compensation device 52 includes a vertex processing device 510, a stitching decision unit 530 and an image processing apparatus 520. In a measure mode, the vertex processing device 510 receives the original vertex list, ten test warping coefficients $C_t(1)$~$C_t(10)$ and ten constant warping coefficients C(11)~C(20) from the stitching decision unit 530, modifies all the texture coordinates of all lens images for each vertex from the original vertex list on a vertex-by-vertex basis and generates a modified vertex list (see Table 2). According to the modified vertex list and three lens images from the image capture module 51, the image processing apparatus 520 measures ten region errors E(1)~E(10) of ten measuring regions M(1)~M(10) in the equirectangular wide-angle image, and outputs the ten region errors E(1)~E(10). Accordingly, the stitching decision unit 530 sets the values of the test warping coefficients $C_t(1)$~$C_t(10)$ based on the offset ofs, and then receives the ten region errors E(1)~E(10) to form a 2D error table; afterward, according to the 2D error table, the stitching decision unit 530 generates the corresponding ten optimal warping coefficients C(1)~C(10) for the ten control points R(1)~R(10). On the other hand, in the rendering mode, the stitching decision unit 530 is disabled; thus, the vertex processing device 510 and the image processing apparatus 520 operate together to generate equirectangular wide-angle images based on three lens images from the image capture module 51 and the ten optimal warping coefficients C(1)~C(10) and the ten constant warping coefficients C(11)~C(20) from the stitching decision unit 530.

In measure mode, the texture coordinates in each lens image for each vertex from the original vertex list are modified by the vertex processing device 510 (so that the image processing apparatus 520 can measure region errors E(1)~E(10) of measuring regions M(1)~M(10)) according to either two "test" warping coefficients or one "test" warping coefficient with one constant warping coefficient of two immediately-adjacent control points of a target vertex and a corresponding blending weight (for warping coefficients) in each lens image for the target vertex (Step S905 & S906 in FIG. 9A), while in rendering mode, the texture coordinates in each lens image for each vertex from the original vertex list are modified to minimize the above mismatch image defect according to either two "optimal" warping coefficients or one "optimal" warping coefficient with one constant warping coefficient of two immediately-adjacent control points of the target vertex and a corresponding blending weight (for warping coefficients) of the target vertex. FIG. 8D is an example showing a position relation between a target vertex P and ten control points R(1)~R(10) in the lens-C image. In the example of FIG. 8D, the first angle $\theta_1$ is clockwise and formed between a first vector V1 (starting from the image center 74 (with texture coordinates ($u_{center}$, $v_{center}$)) to the control point R(4)) and a second vector V2 (starting from the image center 74 to the target vertex P with texture coordinates ($u_p$, $v_p$)), and the angle $\theta_2$ is clockwise and formed between a third vector V3 (starting from the image center 74 to the control point R(5)) and the second vector V2. In offline phase, the correspondence generator 53 determines which two control points (i.e., R(4) and R(5)) are immediately adjacent to the target vertex P and writes their indices (4 and 5) to the "warping coefficient indices" field in the lens-C image of the data structure of the target vertex P in the original vertex list (see Table 1); besides, the correspondence generator 53 calculates a blending weight (=$\theta_2/\theta_1+\theta_2$) for the warping coefficients (C(4) and C(5)) and writes the blending corresponding weight (=$\theta_2/\theta_1+\theta_2$) to the "Alpha" field in the lens-C image of the data structure of the target vertex P in the original vertex list. Please note that a set of ten test warping coefficients ($C_t(1)$ to $C_t(10)$) for the measure mode and a set of ten optimal warping coefficients (C(1) to C(10)) for rendering mode from the stitching decision unit 530 are respectively arranged as a 1-D warping coefficient array or a 1-D data stream; moreover, values of the set of ten test warping coefficients ($C_t(1)$ to $C_t(10)$) are set by the stitching decision unit 530 according to the offset ofs in FIG. 7A in measure mode (step S902; will be described below) while values of the set of ten optimal warping coefficients (C(1) to C(10)) are determined by the stitching decision unit 530 at the end of the measure mode (step S972) and used in the rendering mode.

A feature of the invention is to determine optimal warping coefficients for the ten control points R(1)~R(10) within a predefined number of loops (e.g., max in FIG. 9A) in measure mode. The predefined number of loops are associated with an offset ofs that a lens center 76 is separated from the camera system center 73 (see FIG. 7A). In measure mode, the ten test warping coefficients $C_t(1)$~$C_t(10)$ are set by the stitching decision unit 530 to different value ranges for measuring the region errors E(1)~E(10) according to the offset ofs in FIG. 7A, but the ten test warping coefficients are set to the same value at a time (or for each round). For example, in a case of ofs=3 cm, the ten test warping coefficients $C_t(1)$~$C_t(10)$ are set to values ranging from 0.96 to 1.04 and there would be nine (i.e., max=9 in FIG. 9A) times of measurement if each increment is 0.01; in a case of ofs=1 cm, the ten test warping coefficients $C_t(1)$~$C_t(10)$ are set from 0.99 to 1.00 and there would be ten (i.e., max=10 in FIG. 9A) times of measurement if each increment is 0.001. Please note that in the offline phase, the offset ofs is already detected/determined and thus the values of the ten test warping coefficients $C_t(1)$~$C_t(10)$ for measurement are pre-determined.

Figure 9A:
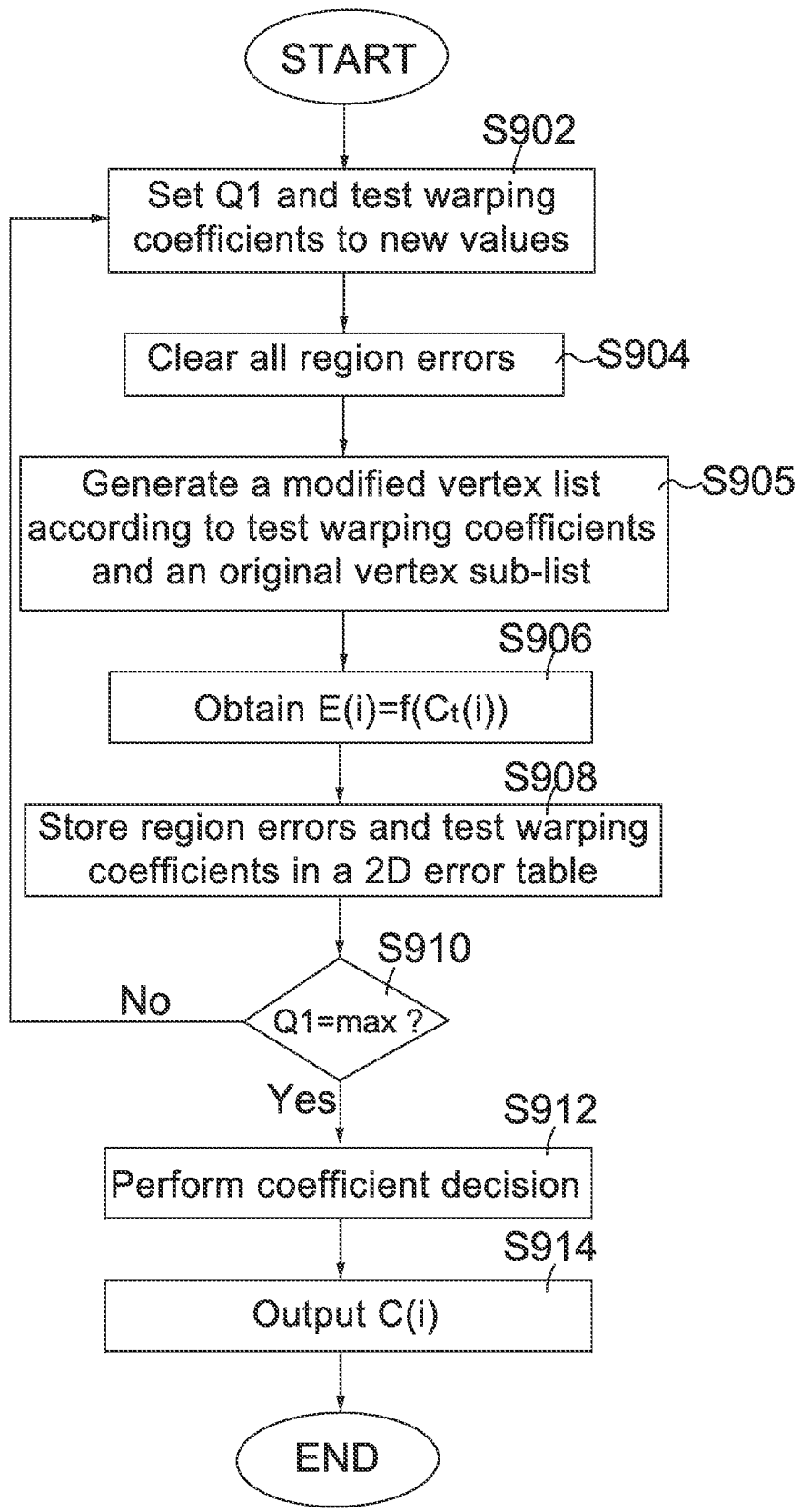
FIG. 9A is a flow chart showing a method of determining the optimal warping coefficients for control points in measure mode performed by the stitching decision unit 530.
Figure 9B:
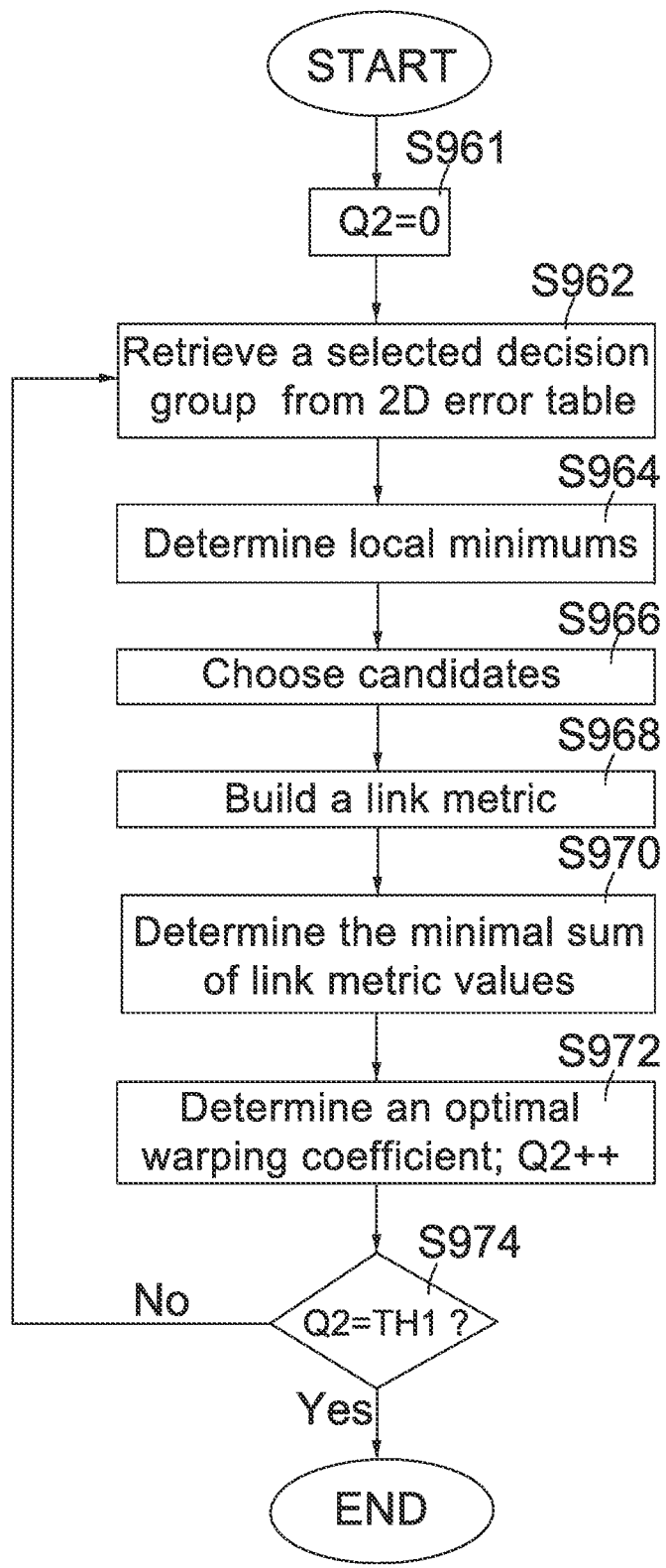
FIG. 9B is a flow chart showing the detailed operations of performing the coefficient decision in step S912 by the stitching decision unit 530.

FIG. 9A is a flow chart showing a method of determining the optimal warping coefficients for control points in measure mode performed by the stitching decision unit 530. For purpose of clarity and ease of description, the method of determining the optimal warping coefficients C(1)~C(10) for ten control points R(1)~R(10) in FIG. 9A and the method of performing the coefficient decision (step S912) in FIG. 9B are described with the assumption that ofs=3 cm.

Step S902: Respectively set the Q1 number of iterations and test warping coefficients to new values. In one embodiment, set the Q1 number of iterations to 1 in a first round and increment Q1 by 1 in each of the following rounds; since ofs=3 cm, set all the ten test warping coefficients $C_t(1)$~$C_t(10)$ to 0.96 in a first round (i.e., $C_t(1)$= . . . =$C_t(10)$=0.96), and then set them to 0.97, . . . , 1.04 in order in the following eight rounds.

Step S904: Clear all region errors E(i), where i=1, . . . , 10.

Step S905: Generate a modified vertex list according to the original vertex list and values of the test warping coefficients $C_t(1)$~$C_t(10)$. Again, take FIG. 8D for example. After receiving the original vertex list from the correspondence generator 53, the vertex processing device 510 simply retrieves two warping coefficients (i.e., $C_t(4)$ and $C_t(5)$) from the 1-D test warping coefficient array ($C_t(1)$~$C_t(10)$) based on the "warping coefficient indices" field (i.e., 4 and 5) in the lens-C image of the data structure of the target vertex P and calculates the interpolated warping coefficient C' based on the "Alpha" field (i.e., $\theta_2/(\theta_1+\theta_2)$) in the lens-C image of the data structure of the target vertex P (see Table 1) by the following equation: C'=$C_t(4) \times (\theta_2/(\theta_1+\theta_2)) + C_t(5) \times (\theta_1/(\theta_1+\theta_2))$. Then, the vertex processing device 510 calculates modified texture coordinates ($u'_p$, $v'_p$) in the lens-C image for the target vertex P with texture coordinates ($u_p$, $v_p$) according to the following equations: $u'_p = (u_p - u_{center}) \times C' + u_{center}$; $v'_p = (v_p - v_{center}) \times C' + v_{center}$. In this manner, the vertex processing device 510 modifies all the texture coordinates in the lens-C image for each vertex from the original vertex list according to the ten test warping coefficients $C_t(1)$~$C_t(10)$ to generate a portion of a modified vertex list. Likewise, the vertex processing device 510 respectively modifies all the texture coordinates in lens-A and lens-B images for each vertex from the original vertex list according to the ten test warping coefficients $C_t(1)$~$C_t(10)$ and the constant warping coefficients C(11)~C(20) to complete the modified vertex list. Table 2 shows an exemplary data structure of each vertex in the modified vertex list.

TABLE 2

| Attributes | Descriptions |
| --- | --- |
| (x, y) | Equirectangular coordinates |
| N | Number of covering/overlapping lens images |
| $ID_1$ | ID of first lens image |
| ($u'_1$, $v'_1$) | Modified texture coordinates in first lens image |
| $w_1$ | Blending weight for stitching in first lens image |
| . . . | |
| $ID_N$ | ID of $N^{th}$ lens image |
| ($u'_N$, $v'_N$) | Modified texture coordinates in $N^{th}$ lens image |
| $w_N$ | Blending weight for stitching in $N^{th}$ lens image |

Step S906: Measure/obtain region errors E(1)~E(10) of ten measuring regions M(1)~M(10) in the equirectangular wide-angle image by the image processing apparatus 520 (will be described in connection with FIG. 5B) based on the modified vertex list and three lens images from the image capture module 51. For ease of description, this step S906 is denoted by E(i)=f($C_t(i)$), where i=1, . . . , 10; f( ) denotes a function that measures the region error E(i) (by the image processing apparatus 520) based on the modified vertex list and the three lens images.

Step S908: Store all region errors E(1)~E(10) and all values of test warping coefficients in a 2D error table. Table 3 shows an exemplary two-dimensional (2D) error table for ofs=3 cm (test warping coefficients ranging from 0.96 to 1.04). In Table 3, there are ten region errors E(1)~E(10) and nine values of test warping coefficients (0.96-1.04).

TABLE 3

| Test warping coefficient | 1st 0.96 | 2nd 0.97 | 3rd 0.98 | — | 7th 1.02 | 8th 1.03 | 9th 1.04 |
| --- | --- | --- | --- | --- | --- | --- | --- |
| E(1) | | | | | | | |
| E(2) | | | | | | | |
| | | | | — | | | |
| E(7) | | | | — | | | |
| E(8) | | | | | | | |
| E(9) | | | | | | | |
| E(10) | | | | | | | |

Step S910: Determine whether the Q1 number of iterations reaches a max value of 9. If YES, the flow goes to step S912; otherwise, the flow goes to Step S902.

Step S912: Perform coefficient decision according to the 2D error table.

Step S914: Output optimal warping coefficients C(i), where i=10. In rendering mode, the optimal warping coefficients C(1)~C(10) are outputted to the vertex processing device 510 for generation of a corresponding modified vertex list, and then the image processing apparatus 520 generates a corresponding wide-angle image (will be described below) based on the modified vertex list and three lens images from the image capture module 51.

FIG. 9B is a flow chart showing the method of performing the coefficient decision in step S912 by the stitching decision unit 530 according to an embodiment of the invention.

Step S961: Set Q2 to 0 for initialization.

Step S962: Retrieve a selected decision group from the 2D error table. Referring to FIG. 8C, since each control point normally adjoins two control points, a selected control point along with its two neighboring control points form a selected decision group to determine the optimal warping coefficient for a selected control point. For example, a selected control point R(9) along with R(8) and R(10) form a selected decision group. However, if a selected control point (such as R(6)) is located at top or bottom of the overlap region A(2) as shown in FIGS. 8A and 8C, then the selected control point R(6) form a selected decision group along with its single neighbor R(7) to determine its optimal warping coefficient C(6). For ease of description, the following steps are described with the assumption that R(7) is selected and forms a selected decision group along with R(6) and R(8) to determine its optimal warping coefficient C(6).

Step S964: Determine local minimums among the region errors for each control point in the selected decision group. Table 4 is an example showing the region errors E(6)~E(8) and the nine values of the test warping coefficients.

TABLE 4

| index | test warping coefficient | E(6) | E(7) | E(8) |
|---|---|---|---|---|
| 1 | 0.96 | 1010 | 2600(*) | 820 |
| 2 | 0.97 | 1005 | 2650 | 750 |
| 3 | 0.98 | 1000 | 2800 | 700 |
| 4 | 0.99 | 900 | 3000 | 600(*) |
| 5 | 1.00 | 800(*) | 2700 | 650 |
| 6 | 1.01 | 850 | 2500 | 580 |
| 7 | 1.02 | 950 | 2400(*) | 500(*) |
| 8 | 1.03 | 960 | 2820 | 700 |
| 9 | 1.04 | 975 | 2900 | 800 |

As shown in Table 4, there is one local minimum among the nine region errors of R(6), and there are two local minimums among the nine region errors of R(7) and R(8), where each local minimum is marked with an asterisk.

Step S966: Choose candidates according to the local minimums. Table 5 shows candidates selected from the local minimums in Table 4, where ID denotes the index, WC denotes the warping coefficient and RE denotes the region error. The number of candidates is equal to the number of the local minimums in Table 4.

TABLE 5

| Number of local minimums | R(6) 1 | | | R(7) 2 | | | R(8) 2 | | |
|---|---|---|---|---|---|---|---|---|---|
| | ID | WC | RE | ID | WC | RE | ID | WC | RE |
| Candidate [0] | 5 | 1.00 | 800 | 1 | 0.96 | 2600 | 4 | 0.99 | 600 |
| Candidate [1] | | | | 7 | 1.02 | 2400 | 7 | 1.02 | 500 |

Figure 9C:
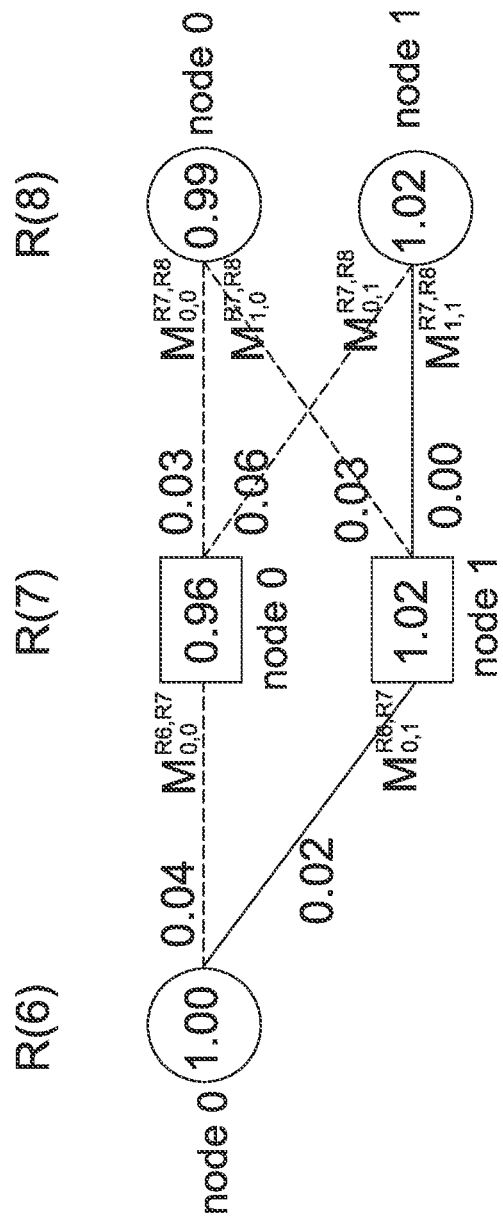
FIG. 9C shows an exemplary link metric.

Step S968: Build a link metric according to the candidates in Table 5. As shown in FIG. 9C, a link metric is built according to the candidates in Table 5.

Step S970: Determine the minimal sum of link metric values among the paths. For the link metric values $M_{0,0}^{R7,R8}=0.03$ and $M_{0,1}^{R7,R8}=0.06$, their minimum value $d_0^{R7,R8}=\min(M_{0,0}^{R7,R8}, M_{0,1}^{R7,R8})=0.03$. For the link metric values $M_{1,0}^{R7,R8}=0.03$ and $M_{1,1}^{R7,R8}=0.00$, their minimum value $d_1^{R7,R8}=\min(M_{1,0}^{R7,R8}, M_{1,1}^{R7,R8})=0.00$. Then, respectively compute sums of link metric values for path 0-0-0 and path 0-1-1 as follows: $S_0^{R7}=d_0^{R6,R7}+d_0^{R7,R8}=0.04+0.03=0.07$ and $S_1^{R7}=d_1^{R6,R7}+d_1^{R7,R8}=0.02+0.00=0.02$. Since $S_0^{R7}>S_1^{R7}$, it is determined that $S_1^{R7}$ (for path 0-1-1) is the minimal sum of link metric values among the paths as the solid-line path shown in FIG. 9C.

Step S972: Determine an optimal warping coefficient for the selected control point. As to the example given in step S970, since $S_1^{R7}$ (for path 0-1-1) is the minimal sum of link metric values among the paths, 1.02 is selected as the optimal warping coefficient of control point R(7). However, if two or more paths have the same sum at the end of calculation, the warping coefficient of the node with minimum region error is selected as the optimal warping coefficient of the selected control point. Here, the Q2 number of iterations is incremented by 1.

Step S974: Determine whether the Q2 number of iterations reaches a limit value of TH1(=10). If YES, the flow is terminated; otherwise, the flow goes to Step S962 for a next control point.

Figure 7A:
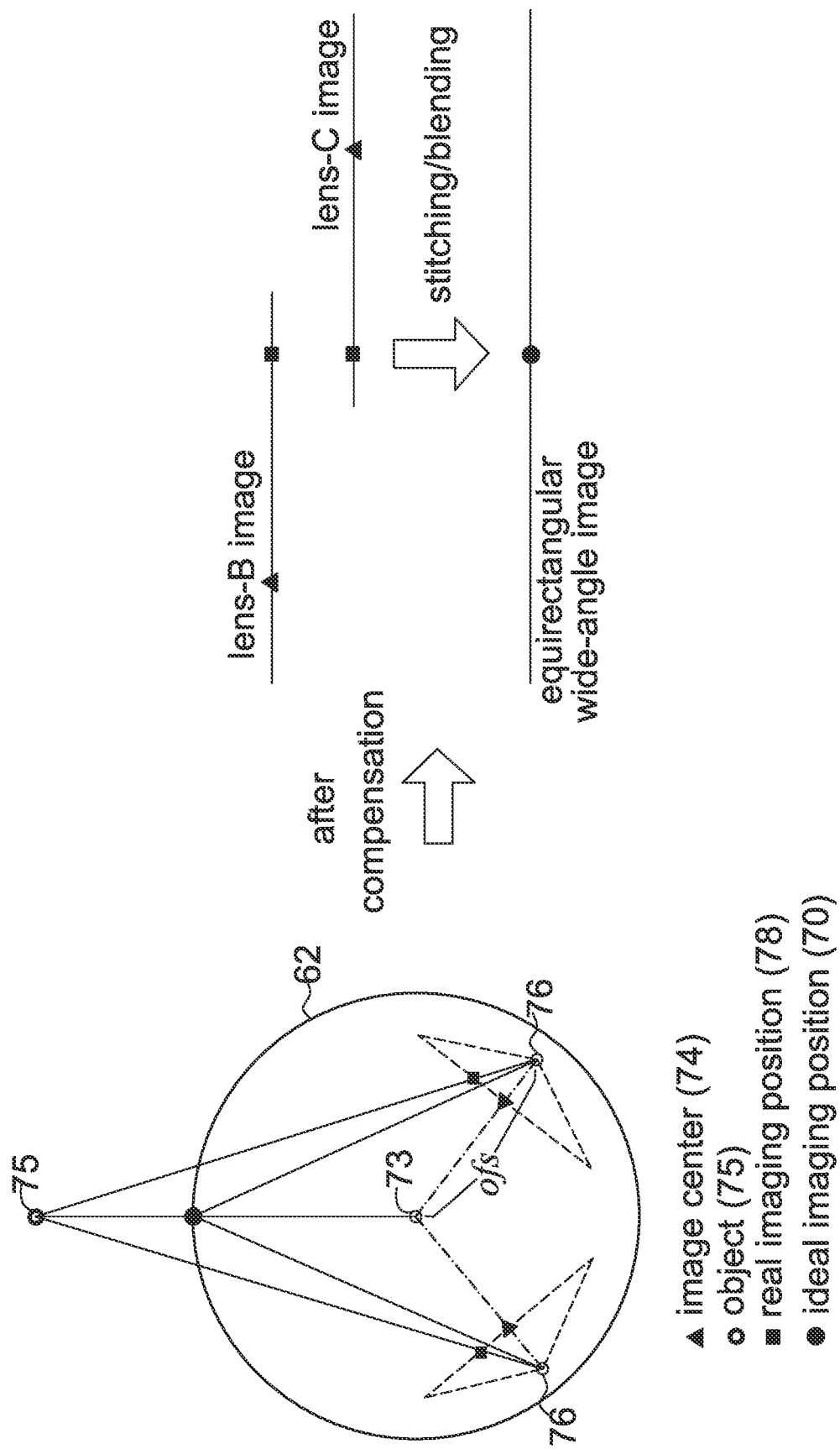
FIG. 7A shows a mismatch image defect caused by an offset ofs (that a lens center 76 is separated from the camera system center 73) is improved after all the texture coordinates of all vertices are modified by the vertex processing device 510 according to the optimal warping coefficients.
Figure 7C:
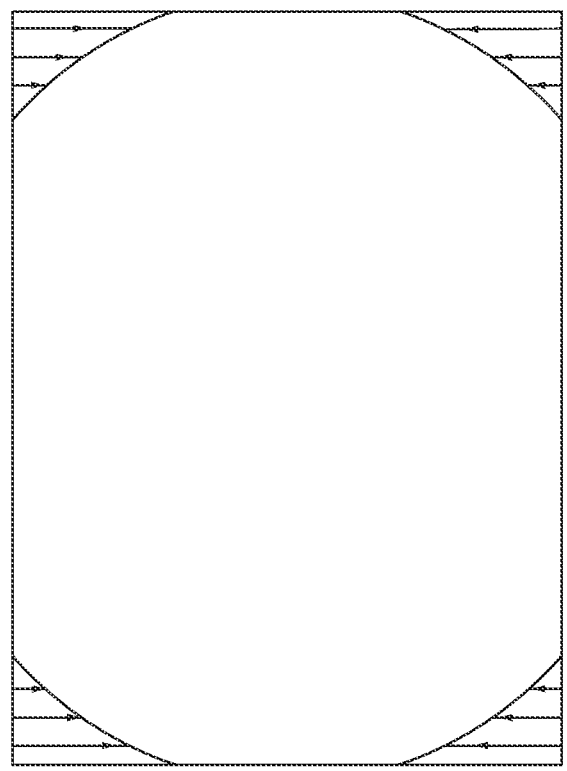
FIG. 7C shows each column of pixels is respectively scanned from top to bottom to obtain a top boundary point and from bottom to top to obtain a bottom boundary point in a lens image.
Figure 7B:
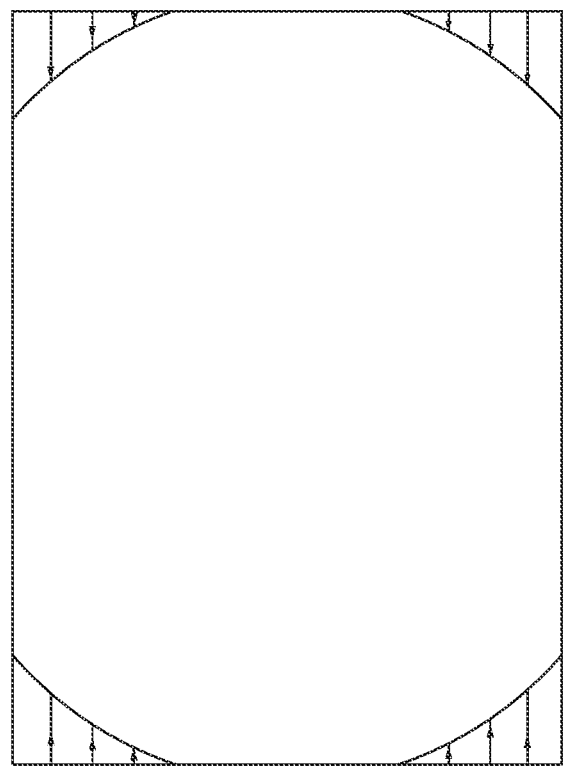
FIG. 7B shows each row of pixels is respectively scanned from left to right to obtain a left boundary point and from right to left to obtain a right boundary point in a lens image.
Figure 8D:
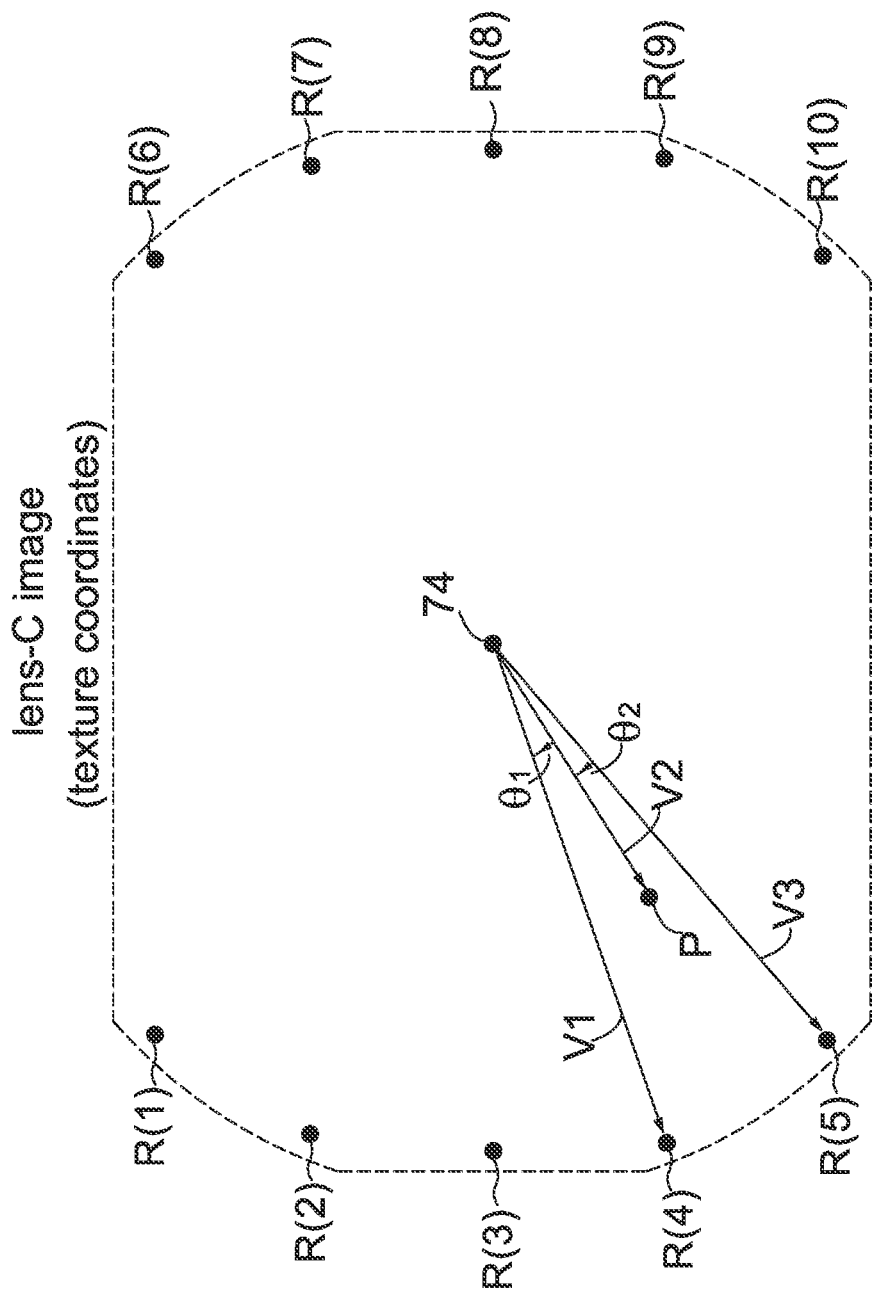
FIG. 8D is an example showing a position relationship between the target vertex P and ten control points R(1)~R(10) in the lens-C image.

After all the texture coordinates in the three lens images for all vertices from the original vertex list are modified by the vertex processing device 510 according to the ten optimal warping coefficients (C(1)~C(10)), the mismatch image defects caused by shifted lens centers of the camera 51 (e.g., a lens center 76 is separated from the system center 73 by an offset ofs) would be greatly improved (i.e., the real imaging positions 78 are pulled toward the idea imaging positions 70) as shown on the right side of FIG. 7A. Please note that since the sphere 62 is virtual, the object 75 may be located outside, or inside the sphere 62 or on the surface of the sphere 62.

Figure 5B:
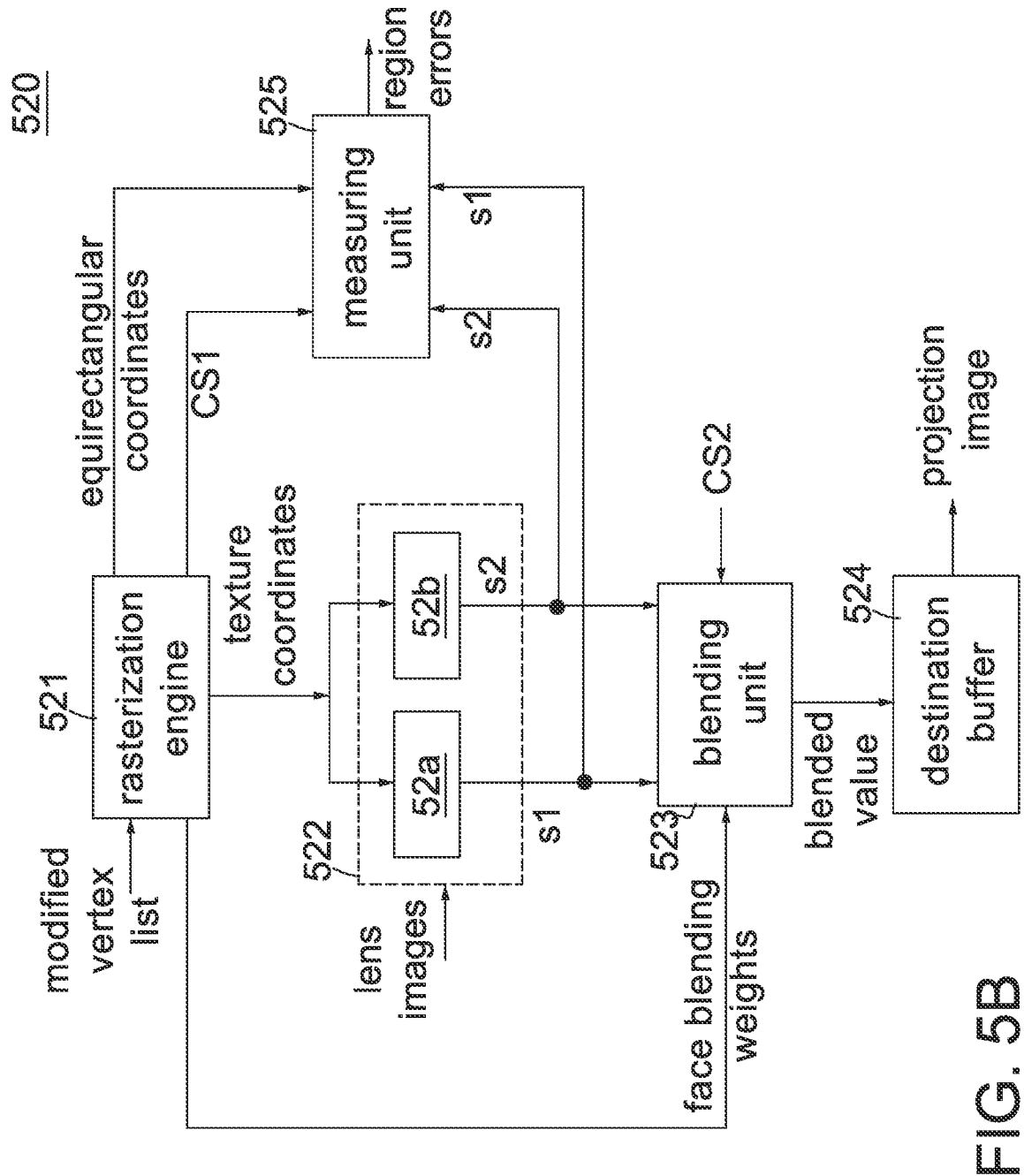
FIG. 5B is a schematic diagram of the image processing apparatus 520 according to one embodiment of the invention.

FIG. 5B is a schematic diagram of the image processing apparatus 520 according to one embodiment of the invention. Referring to FIG. 5B, the image processing apparatus 520 includes a rasterization engine 521, a texture mapping circuit 522, a blending unit 523 controlled by a control signal CS2, a destination buffer 524 and a measuring unit 525 controlled by a control signal CS1. Please note that the blending unit 523 is disabled by the control signal CS2 and the measuring unit 525 is enabled by the control signals CS1 if the equirectangular coordinates of a pixel/point fall in the measuring regions in measure mode. The blending unit 523 is enabled by the control signal CS2 and the measuring unit 525 is disabled by the control signal CS1 in rendering mode. The texture mapping circuit 522 includes two texture mapping engines 52a-52b. The rasterization engine 521 may perform quadrilateral rasterization for each point/pixel in each quadrilateral in FIG. 6C formed by each group of four vertices from the modified vertex list, or perform triangle rasterization for each point/pixel in each triangle in FIG. 6C formed by each group of three vertices from the modified vertex list.

Referring to FIG. 8C, for a quadrilateral case, assuming each of four vertices (E, F, G, H) (forming one quadrilateral of the polygon mesh) from the modified vertex list is located in one of the measuring regions M(1)~M(5) of overlap region A(1) and is overlapped with lens-B and lens-C images (N=2), the four vertices (E, F, G, H) have the following data structures contained in the modified vertex list: vertex E:$\{(x_E, y_E), 2, ID_{lens-B}, (u_{1E}, v_{1E}), w_{1E}, ID_{lens-C}, (u_{2E}, v_{2E}), w_{2E}\}$, vertex F:$\{(x_F, y_F), 2, ID_{lens-B}, (u_{1F}, v_{1F}), w_{1F}, ID_{lens-C}, (u_{2F}, v_{2F}), w_{2F}\}$, vertex G:$\{(x_G, y_G), 2, ID_{lens-B}, (u_{1G}, v_{1G}), w_{1G}, ID_{lens-C}, (u_{2G}, v_{2G}), w_{2G}\}$, vertex H:$\{(x_H, y_H), 2, ID_{lens-B}, (u_{1H}, v_{1H}), w_{1H}, ID_{lens-C}, (u_{2H}, v_{2H}), w_{2H}\}$. The rasterization engine 521 directly performs quadrilateral rasterization operations for each point/pixel in the quadrilateral EFGH. Specifically, the rasterization engine 521 computes texture coordinates for each lens image based on a point Q having equirectangular coordinates (x, y) within a quadrilateral EFGH of the polygon mesh by using the following steps: (1) Compute four spatial weighting values (e,f,g,h) according to equirectangular coordinates $(x_E, y_E, x_F, y_F, x_G, y_G, x_H, y_H, x, y)$ by using a bi-linear interpolation method. (2) compute a face blending weight $fw_1$ for a sample point $Q_{lens-B}$ (corresponding to point Q) in lens-B image: $fw_1=e*w_{1E}+f*w_{1F}+g*w_{1G}+h*w_{1H}$, compute a face blending weight $fw_2$ for a sample point $Q_{lens-C}$ (corresponding to point Q) in lens-C image: $fw_2=e*w_{2E}+f*w_{2F}+g*w_{2G}+h*w_{2H}$. (3) compute texture coordinates for the sample point $Q_{lens-B}$ (corresponding to point Q) in lens-B image: (u1,v1)=$(e*u_{1E}+f*u_{1F}+g*u_{1G}+h*u_{1H}, e*v_{1E}+f*v_{1F}+g*v_{1G}+h*v_{1H})$, compute texture coordinates for the sample point $Q_{lens-C}$ (corresponding to point Q) in lens-C image: (u2,v2)=$(e*u_{2E}+f*u_{2F}+g*u_{2G}+h*u_{2H}, e*v_{2E}+f*v_{2F}+g*v_{2G}+h*v_{2H})$. Finally, the rasterization engine 521 sends the two texture coordinates (u1, v1) and (u2, v2) to the two texture mapping engines 52a~52b in parallel, and sends the two face blending weights $fw_1$ and $fw_2$ to the blending unit 523. Here, e+f+g+h=1 and $fw_1+fw_2=1$. According to the two texture coordinates (u1, v1) and (u2, v2), the texture mapping engines 52a~52b texture map the texture data from the lens-B and lens-C images using any appropriate method (such as nearest-neighbour interpolation, bilinear interpolation or trilinear interpolation) to generate two sample values s1 and s2. Here, the sample value (s1~s2) may be a luma value, a chroma value, an edge value, a pixel color value (RGB), or a motion vector.

For a triangle case, the rasterization engine 521 and the texture mapping engines 52a~52b perform operations similar to the above quadrilateral case for each point/pixel in a triangle formed by each group of three vertices from the modified vertex list to generate two corresponding sample values s1 and s2, except that the rasterization engine 521 computes three spatial weighting values (e, f, g) for three input vertices (E, F, G) forming a triangle of the polygon mesh in FIG. 6C according to equirectangular coordinates $(x_E, y_E, x_F, y_F, x_G, y_G, x, y)$ by using a barycentric weighting method, rather than by using a bi-linear interpolation method in step (1).

Next, according to the equirectangular coordinates (x, y) of the point Q, the rasterization engine 521 determines whether the point Q falls in one of the five measuring regions M(1)~M(5) and then asserts the control signal CS1 to cause the measuring unit 525 to estimate/measure the region error of the measuring region if the point Q falls in one of the five measuring regions. The measuring unit 525 may estimate/measure the region errors of the measuring regions M(1)~M(5) by using known algorithms, such as SAD (sum of absolute differences), SSD (sum of squared differences), MAD (median absolute deviation), etc. For example, if the point Q is determined to fall in measuring region M(1), the measuring unit 525 may accumulate the absolute value of the sample value difference between each point in the measuring region M(1) of the lens-B image and its corresponding point in the measuring region M(1) of the lens-C image to obtain the SAD value as the region error E(1) for the measuring region M(1), by using the following equations: E=|s1−s2|, E(1)+=E. In this manner, the measuring unit 525 measures five region errors E(1)~E(5) for the measuring regions M(1)~M(5) in measure mode. In the same manner, the measuring unit 525 measures region errors E(6)~E(10) for the five measuring regions M(6)~M(10) according to the modified vertex list, the lens-C image and the lens-A image in measure mode.

In rendering mode, the rasterization engine 521 and the texture mapping circuit 522 operate in the same way as in measure mode. Again, take the above case (the point Q has equirectangular coordinates (x, y) within the quadrilateral EFGH that are overlapped with lens-B and lens-C images (N=2)) for example. After the texture mapping engines 52a~52b texture map the texture data from the lens-B and lens-C images to generate two sample values s1 and s2, the blending unit 523 blends the two sample values (s1, s2) together to generate a blended value Vb of point Q using the following equation: $Vb=fw_1*s1+fw_2*s2$. Finally, the blending unit 523 stores the blended value Vb of point Q into the destination buffer 524. In this manner, the blending unit 523 sequentially stores all the blended values Vb into the destination buffer 524 until all the points within the quadrilateral EFGH are processed/completed. On the other hand, if a point Q' has equirectangular coordinates (x', y') within a quadrilateral E'F'G'H' located in non-overlap region (N=1) of one lens image (e.g., lens-B image), the rasterization engine 521 will only send one texture coordinates (e.g., u1, v1)) to one texture mapping engine 52a, and one face blending weight $fw_1(=1)$ to the blending unit 523. Correspondingly, the texture mapping engine 52a textures map the texture data from the lens-B image to generate a sample value s1. The blending unit 523 generates and stores a blended value $Vb(=fw_1*s1)$ of point Q' in the destination buffer 524. In this manner, the blending unit 523 sequentially stores all the blended values into the destination buffer 524 until all the points within the quadrilateral E'F'G'H' are processed/completed. Once all the quadrilaterals/triangles are processed, a projection image is stored in the destination buffer 524.

Figure 10A:
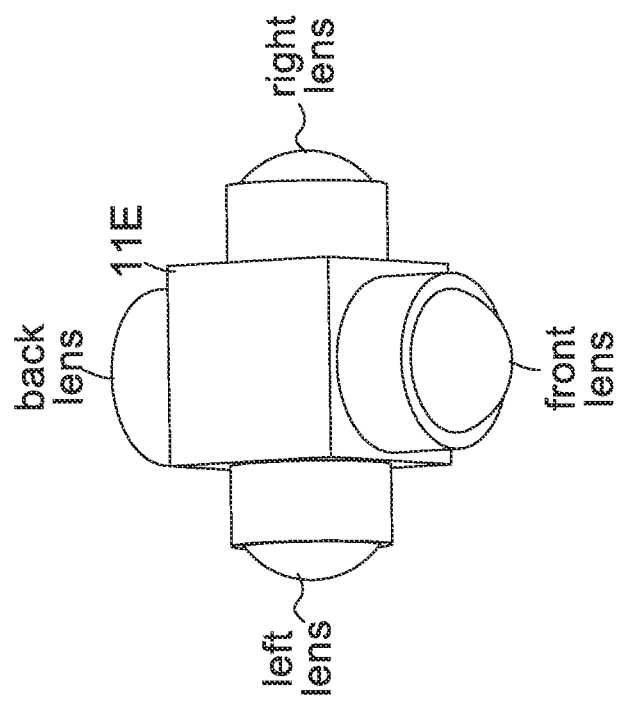
FIG. 10A is an exemplary outward four-lens camera mounted on a framework 11E.
Figure 10B:
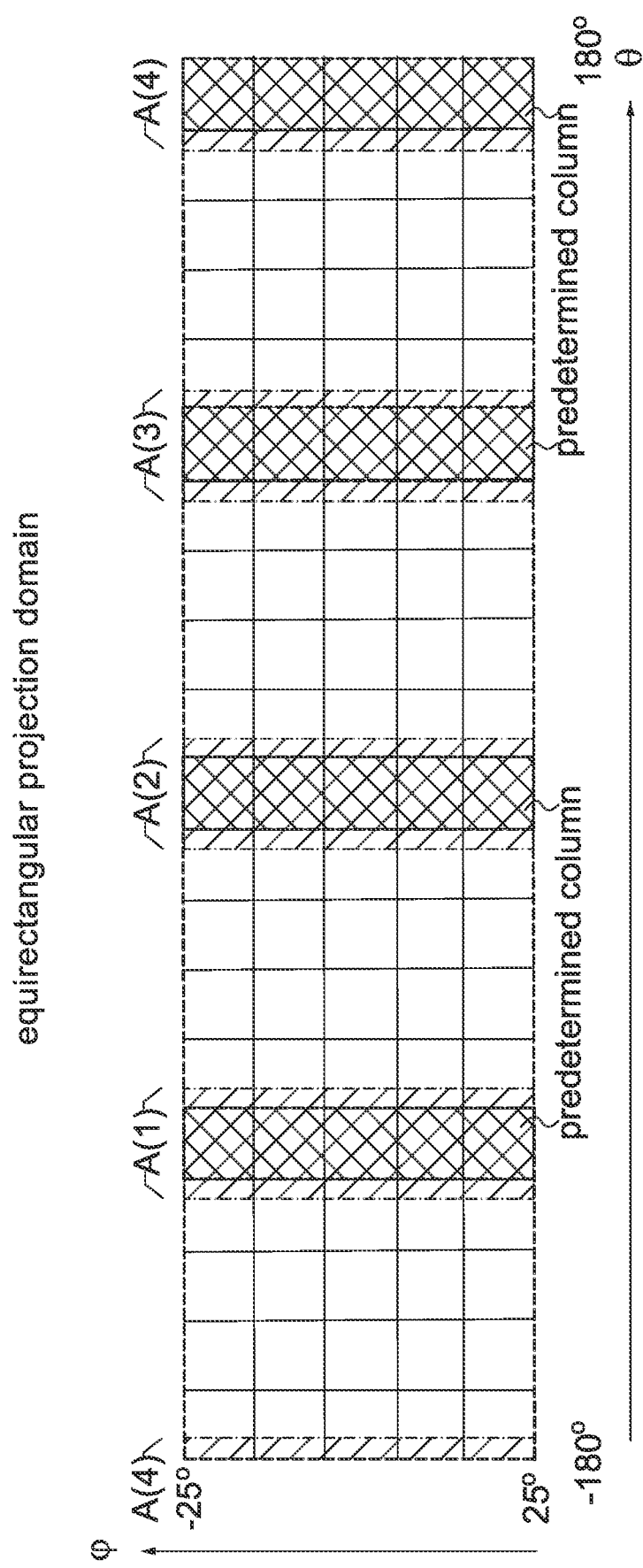
FIG. 10B is a diagram showing an example grid modeling an equirectangular panoramic image containing four overlap regions A(1)~A(4) and four lens images from the outward four-lens camera in FIG. 10A.
Figure 10C:
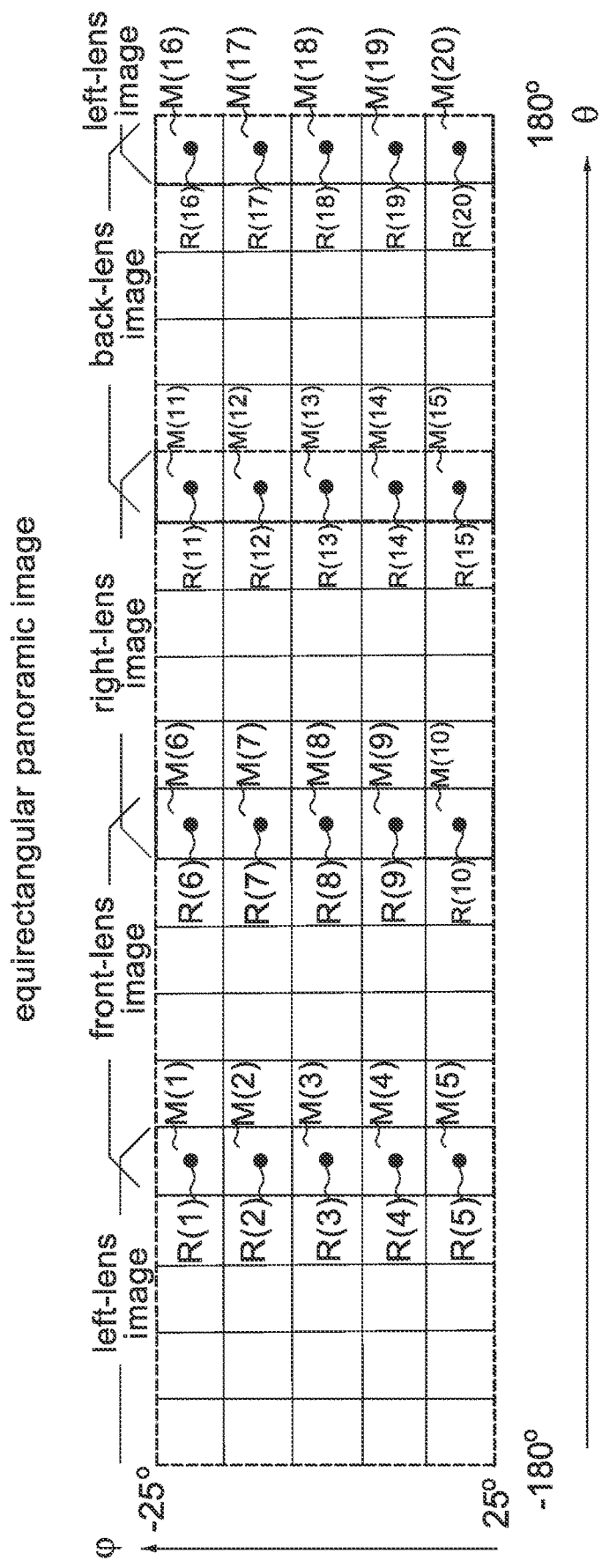
FIG. 10C is a diagram showing twenty control points R(1)~R(20) and twenty measuring regions M(1)~M(20) in the equirectangular panoramic image with P1=5 and M=4.

In a case that the image capture module 51 is an outward M-lens camera and the projection image is a panoramic image, in offline phase, the correspondence generator 53 also takes the above four steps (a)~(d) to determine the texture coordinates of control points, except to modify step (a) as follows: Define the predetermined column located in each overlap region in the equirectangular panoramic image as "a control column". Take M=4 (as shown in FIG. 10A) for example. FIG. 10A is an exemplary outward four-lens camera mounted on a framework 11E. It is assumed that the outward four-lens camera in FIG. 10A is capable of simultaneously capturing a view with a 360-degree horizontal FOV and a 50-degree vertical FOV to generate four lens images. FIG. 10B is a diagram showing an example grid modeling an equirectangular panoramic image containing four overlap regions A(1)~A(4) and including four lens images (left, front, right, back) from the outward four-lens camera in FIG. 10A. It is assumed that the example grid in FIG. 10B corresponds to the polygon mesh in FIG. 6C and thus the vertices/intersection of the grid in FIG. 10B correspond to the vertices of the polygon mesh in FIG. 6C. FIG. 10C is a diagram showing twenty control points R(1)~R(20) and twenty measuring regions M(1)~M(20) in the equirectangular panoramic image associated with FIG. 10B with P1=5. In the examples of FIGS. 10B-10C, because all the control points R(1)~R(20) are located in overlap regions A(1)~A(4), the optimal warping coefficients C(1)~C(20) for the twenty control points R(1)~R(20) are also determined by the stitching decision unit 530 according to the methods in FIGS. 9A-9B with TH1=20.

The compensation device 52 and the correspondence generator 53 according to the invention may be hardware, software, or a combination of hardware and software (or firmware). An example of a pure solution would be a field programmable gate array (FPGA) design or an application specific integrated circuit (ASIC) design. In a preferred embodiment, the vertex processing device 510 and an image processing apparatus 520 are implemented with a graphics processing unit (GPU) and a first program memory; the stitching decision unit 530 and the correspondence generator 53 are implemented with a first general-purpose processor and a second program memory. The first program memory stores a first processor-executable program and the second program memory stores a second processor-executable program. When the first processor-executable program is executed by the GPU, the GPU is configured to function as: the vertex processing device 510 and the image processing apparatus 520. When the second processor-executable program is executed by the first general-purpose processor, the general-purpose processor is configured to function as: the stitching decision unit 530 and the correspondence generator 53.

In an alternative embodiment, the compensation device 52 and the correspondence generator 53 are implemented with a second general-purpose processor and a third program memory. The third program memory stores a third processor-executable program. When the third processor-executable program is executed by the second general-purpose processor, the second general-purpose processor is configured to function as: the vertex processing device 510, the image processing apparatus 520, the stitching decision unit 530 and the correspondence generator 53.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An image processing system, comprising:
    an M-lens camera that captures a X-degree horizontal field of view (FOV) and a Y-degree vertical FOV to generate M lens images;
    one or more first processors configured to perform a set of actions comprising:
    generating a projection image according to a first vertex list and the M lens images; and
    a second processor configured to perform a set of operations comprising:
    conducting calibration for multiple vertices to define first vertex mappings between the M lens images and the projection image;
    horizontally and vertically scanning each lens image to determine texture coordinates of an image center of each lens image;
    determining texture coordinates of all control points according to the first vertex mappings and P1 control points in each overlap region in the projection image; and
    determining two adjacent control points and a coefficient blending weight for each vertex in each lens image according to the texture coordinates of all the control points and the image center in each lens image to generate the first vertex list, wherein X<=360, Y<180, M>=2 and P1>=3.

2. The system according to claim 1, wherein the first vertex list comprises the vertices with first data structures, and the first data structure of each vertex comprises the first vertex mapping between the M lens images and the projection image, two indices of the two adjacent control points and the coefficient blending weight in each lens image.

3. The system according to claim 1, wherein the projection image is a collection of quadrilaterals defined by the vertices and the operation of determining the texture coordinates of the control points comprises:
    selecting one column of quadrilaterals from each overlap region in the projection image as a predetermined column;
    when the projection image is a wide-angle image, defining predetermined column, the leftmost and the rightmost columns of quadrilaterals in the projection image as control columns;
    when the projection image is a panoramic image, defining each predetermined column as a control column;
    placing a top control point and a bottom control point at the centers of the top and the bottom quadrilaterals for each control column to determine x coordinates of the P1 control points for each control column in the projection image;
    dividing a distance between the top control point and the bottom control point by (P1-2) to obtain y coordinates of (P1-2) control points for each control column in the projection image; and
    performing interpolation to obtain texture coordinates of each control point according to the x and the y coordinates of each control point and the first vertex mappings.

4. The system according to claim 3, wherein the operation of determining the texture coordinates of the control points further comprises:
    for a quadrilateral i in each predetermined column,
    searching for a control point j closest to the quadrilateral i; and
    categorizing the quadrilateral i as a measuring region j;
    where 1=<i<=n1, 1=<j=<P1 and n1 denotes a number of quadrilaterals in each predetermined column.

5. The system according to claim 1, wherein the projection image is derived from a predefined projection of the M lens images, and is one of a wide-angle image and a panoramic image.

6. The system according to claim 5, wherein the predefined projection is one of equirectangular projection, cylindrical projection, Miller projection, Mercator projection, Lambert cylindrical equal area projection and Pannini projection.

7. The system according to claim 1, wherein the operation of horizontally and vertically scanning comprises:
    for a target lens image,
    respectively scanning each row of pixels from left to right and from right to left to obtain a left boundary point and a right boundary point of each row according to a luma threshold value;
    respectively scanning each column of pixels from top to bottom and from bottom to top to obtain a top boundary point and a bottom boundary point of each column according to the luma threshold value;
    calculating a row center for each row according to the left boundary point and the right boundary point of each row;
    calculating a column center for each column according to the top boundary point and the bottom boundary point of each column;
    averaging the row centers of all rows to obtain x coordinate of the image center in the target lens image; and
    averaging the column centers of all columns to obtain y coordinate of the image center in the target lens image.

8. The system according to claim 1, wherein the coefficient blending weight for a target vertex in a specified lens image is associated with a first angle and a second angle, wherein the first angle is formed between a first vector from the image center of the specified lens image to a first control point of the two adjacent control points and a second vector from the image center of the specified lens image to the target vertex, and wherein the second angle is formed between a third vector from the image center of the specified lens image to a second control point of the two adjacent control points and the second vector.

9. The system according to claim 1, wherein the action of generating the projection image comprises:
    an action of determining a set of optimal warping coefficients for the control points according to a 2D error table comprising multiple test optimal warping coefficients and multiple accumulation pixel value differences in measuring regions located in each overlap region and corresponding to the control points in measure mode;
    an action of modifying texture coordinates in each lens image for all vertices from the first vertex list based on either the multiple test warping coefficients in measure mode or the set of optimal warping coefficients in rendering mode to generate a second vertex list;

an action of forming the projection image according to the M lens images and the second vertex list in rendering mode; and an action of measuring the multiple accumulation pixel value differences in the measuring regions in measure mode;

wherein values of the multiple test warping coefficients are associated with an offset that a lens center of the M lenses is separated from a camera system center of the M-lens camera; and wherein the second vertex list comprises the vertices with second data structures that define second vertex mappings between the M lens images and the projection image.

10. The system according to claim 9, wherein in rendering mode, the action of modifying texture coordinates comprises:

for a target vertex from the first vertex list,
(1) for each lens image, retrieving two selected coefficients from the optimal warping coefficients according to two indices of the two adjacent control points in the first data structure of the target vertex;
(2) for each lens image, calculating an interpolated warping coefficient according to the two selected coefficients and the coefficient blending weight in the first data structure of the target vertex;
(3) for each lens image, calculating modified texture coordinates according to the interpolated warping coefficient and the texture coordinates of the target vertex in the first data structure of the target vertex; and
(4) repeating actions (1) to (3) until the modified texture coordinates of all vertices are calculated to generate the second vertex list.

11. The system according to claim 1, wherein the M-lens camera is an inward M-lens camera and an intersection of optical axes of the inward M lenses is formed above the inward M lenses.

12. The system according to claim 1, wherein the M-lens camera is an outward M-lens camera and an intersection of optical axes of the inward M lenses is formed below the outward M lenses.

13. An image processing method, comprising steps of:
conducting calibration for vertices to define first vertex mappings between a projection image and M lens images generated by an M-lens camera that captures a X-degree horizontal field of view (FOV) and a Y-degree vertical FOV;
horizontally and vertically scanning each lens image to determine texture coordinates of an image center of each lens image;
determining texture coordinates of control points according to the first vertex mappings and P1 control points in each overlap region in the projection image;
determining two adjacent control points and a coefficient blending weight for each vertex in each lens image according to the texture coordinates of the control points and the image center in each lens image to generate a first vertex list; and
generating the projection image according to the first vertex list and the M lens images;
wherein $X<=360$, $Y<180$, $M>=2$ and $P1>=3$.

14. The method according to claim 13, wherein the first vertex list comprises the vertices with their first data structures, and the first data structure of each vertex comprises a first vertex mapping between the M lens images and the projection image, two indices of the two adjacent control points and the coefficient blending weight for a corresponding vertex in each lens image.

15. The method according to claim 13, wherein the projection image is a collection of quadrilaterals defined by the vertices and the step of determining the texture coordinates of the control points comprises:
selecting one column of quadrilaterals from each overlap region in the projection image as a predetermined column;
when the projection image is a wide-angle image, defining the predetermined column, the leftmost and the rightmost columns of quadrilaterals in the projection image as control columns;
when the projection image is a panoramic image, defining each predetermined column as a control column;
placing a top control point and a bottom control point at the centers of the top and the bottom quadrilaterals for each control column to determine x coordinates of the P1 control points for each control column in the projection image;
dividing a distance between the top control point and the bottom control point by (P1-2) to obtain y coordinates of (P1-2) control points for each control column in the projection image; and
performing interpolation to obtain texture coordinates of each control point according to the x and the y coordinates of each control point in the projection image and the first vertex mappings.

16. The method according to claim 15, wherein the step of determining the texture coordinates of the control points further comprises:
for a quadrilateral i in each predetermined column, searching for the closest control point j; and
categorizing the quadrilateral i as a measuring region j; where $1<=i<=n1$, $1<=j<=P1$ and n1 denotes a number of quadrilaterals in each predetermined column.

17. The method according to claim 13, wherein the projection image is derived from a predefined projection of the M lens images, and is one of a wide-angle image and a panoramic image.

18. The method according to claim 17, wherein the predefined projection is one of equirectangular projection, cylindrical projection, Miller projection, Mercator projection, Lambert cylindrical equal area projection and Pannini projection.

19. The method according to claim 13, wherein the step of horizontally and vertically scanning comprises:
for a target lens image,
respectively scanning each row of pixels from left to right and from right to left to obtain a left boundary point and a right boundary point of each row according to a luma threshold value;
respectively scanning each column of pixels from top to bottom and from bottom to top to obtain a top boundary point and a bottom boundary point of each column according to the luma threshold value;
calculating a row center for each row according to the left boundary point and the right boundary point of each row;
calculating a column center for each column according to the top boundary point and the bottom boundary point of each column;
averaging the row centers of all rows to obtain x coordinate of the image center of the target lens image; and averaging the column centers of all columns to obtain y coordinate of the image center of the target lens image.

20. The method according to claim 13, wherein the coefficient blending weight for a target vertex in a specified lens image is associated with a first angle and a second angle, wherein the first angle is formed between a first vector from the image center of the specified lens image to a first control point of the two adjacent control points and a second vector from the image center of the specified lens image to the target vertex, and wherein the second angle is formed between a third vector from the image center of the specified lens image to a second control point of the two adjacent control points and the second vector.

21. The method according to claim 13, wherein the step of generating the projection image comprises:

determining a set of optimal warping coefficients for the control points according to a 2D error table comprising multiple test optimal warping coefficients and multiple accumulation pixel value differences in measuring regions located in each overlap region and corresponding to the control points;

modifying all the texture coordinates in each lens image for all vertices from the first vertex list based on the set of optimal warping coefficients to generate a second vertex list; and forming the projection image according to the M lens images and the second vertex list;

wherein values of the multiple test warping coefficients are associated with an offset that a lens center of the M lenses is separated from a camera system center of the M-lens camera; and wherein the second vertex list comprises the vertices with second data structures that define second vertex mappings between the M lens images and the projection image.

22. The method according to claim 21, wherein the step of modifying all the texture coordinates comprises:

for a target vertex from the first vertex list, (1) for each lens image, retrieving two selected coefficients from the set of the optimal warping coefficients according to two indices of the two adjacent control points in the first data structure of the target vertex;

(2) for each lens image, calculating an interpolated warping coefficient according to the two selected coefficients and the coefficient blending weight in the first data structure of the target vertex;

(3) for each lens image, calculating modified texture coordinates according to the interpolated warping coefficient and texture coordinates of the target vertex in the first data structure of the target vertex; and (4) repeating steps (1) to (3) until the modified texture coordinates of all vertices are calculated to generate the second vertex list.

23. The method according to claim 21, wherein the step of determining the set of optimal warping coefficients comprises:

(a) setting the values of the test optimal warping coefficients to one of predefined values in a predefined value range according to the offset that the lens center of the M lenses is separated from the camera system center of the M-lens camera;

(b) modifying all the texture coordinates in each lens image for all vertices from the first vertex list based on the values of the test optimal warping coefficients;

(c) calculating the accumulation pixel value differences in the measuring regions;

(d) repeating the steps (a) to (c) until all the predefined values in the predefined value range are processed to form the 2D error table; and (e) determining the optimal warping coefficient of each target control point on a group-by-group basis according to local minimums among the accumulation pixel value differences of each control point in each decision group comprising the target control point and one or two neighboring control points.

24. The method according to claim 13, wherein the M-lens camera is an inward M-lens camera and an intersection of optical axes of the inward M lenses is formed above the inward M lenses.

25. The method according to claim 13, wherein the M-lens camera is an outward M-lens camera and an intersection of optical axes of the inward M lenses is formed below the outward M lenses.

* * * * *